US012694256B2

(12) United States Patent
Young et al.

(10) Patent No.:   US 12,694,256 B2
(45) Date of Patent:       Jul. 28, 2026

(54) IDENTIFICATION TAG MANAGEMENT SYSTEM

(71) Applicant: Pascal Tags Inc., Louisville, KY (US)

(72) Inventors: Brandon Thomas Young, Louisville, KY (US); Daniel George Woodruff, Louisville, KY (US)

(73) Assignee: Pascal Tags Inc., Louisville, KY (US)

( * ) Notice:      Subject to any disclaimer, the term of this patent is extended or adjusted under 35 U.S.C. 154(b) by 0 days.

(21) Appl. No.: 19/233,826

(22) Filed:      Jun. 10, 2025

(65)                 Prior Publication Data

US 2025/0378298 A1      Dec. 11, 2025

Related U.S. Application Data

(60) Provisional application No. 63/687,223, filed on Aug. 26, 2024, provisional application No. 63/658,317, filed on Jun. 10, 2024.

(51) Int. Cl.
  G06K 19/077         (2006.01)
  G06K 19/07          (2006.01)
(52) U.S. Cl.
  CPC ...   G06K 19/07758 (2013.01); G06K 19/0726 (2013.01)
(58) Field of Classification Search
  CPC ........... G06K 19/0723; G06K 19/0726; G06K 19/07758; G06K 7/10; G06K 7/10069
  See application file for complete search history.

(56)                References Cited

U.S. PATENT DOCUMENTS

| | | | |
|---|---|---|---|
| 2003/0013146 A1 | 1/2003 | Werb | |
| 2017/0288708 A1 | 10/2017 | Ota | |
| 2020/0293848 A1* | 9/2020 | Mochizuki | ......... G06K 7/10009 |
| 2021/0133403 A1 | 5/2021 | Martín Antolín et al. | |
| 2023/0259732 A1 | 8/2023 | Young et al. | |

(Continued)

OTHER PUBLICATIONS

International Search Report and Written Opinion for International Patent Application No. PCT/US2025/043173 mailed on Dec. 29, 2025; 25 pages.

(Continued)

*Primary Examiner* — Laura A Gudorf
(74) *Attorney, Agent, or Firm* — Run8 Patent Group, LLC; Peter Miller; Marissa Kohrman

(57)                ABSTRACT

One variation of a method includes: accessing a target tag identifier for an identification tag; deriving a set of target radio frequency signal characteristics that encode the target tag identifier; and transforming the set of target radio frequency signal characteristics into a map of volumes of a dielectric material arranged proximal a target resonator within the identification tag to modulate a baseline response signal of the target resonator to passively broadcast a target response signal exhibiting the set of target radio frequency signal characteristics. This variation of the method further includes generating a print file according to the map. This variation of the method also includes, at a printer: accessing the print file; loading the identification tag including a substrate and the target resonator; and fabricating volumes of the dielectric material, proximal the target resonator, according to the print file.

20 Claims, 10 Drawing Sheets

(56) References Cited

U.S. PATENT DOCUMENTS

2024/0219889 A1    7/2024    Young et al.

OTHER PUBLICATIONS

Notification of the International Application Number and of the International Filing Date for International Application No. PCT/US2025/043173 mailed on Sep. 24, 2025; 1 page.

Sokoudjou, et al., "Chipless RFID tag implementation and machine-learning workflow for robust identification", IEEE Transactions on Microwave Theory and Techniques, May 25, 2023; vol. 71 (12), pp. 5147-5159, URL:https://ieeexplore.ieee.org/abstract/document/10136207.

Behera et al., "Chipless RFID Printing Technologies", IEEE Xplore, Jun. 2021, URL: https://ieeexplore.ieee.org/stamp/stamp.jsp?tp=&arnumber=9423723.

* cited by examiner

IDENTIFICATION TAG MANAGEMENT SYSTEM

CROSS-REFERENCE TO RELATED APPLICATIONS

This application claims the benefit of U.S. Provisional Application No. 63/687,223, filed on 26 Aug. 2024, and U.S. Provisional Application No. 63/658,317, filed on 10 Jun. 2024, each of which is incorporated in its entirety by this reference.

STATEMENT OF GOVERNMENT INTEREST

This invention was made with government support under Contract No. 2136796 awarded by the National Science Foundation. The government has certain rights in the invention.

TECHNICAL FIELD

This invention relates generally to the field of identification tags and, more specifically, to a new and useful method for generating and managing identification tags.

DESCRIPTION OF THE EMBODIMENTS

Figure 1:
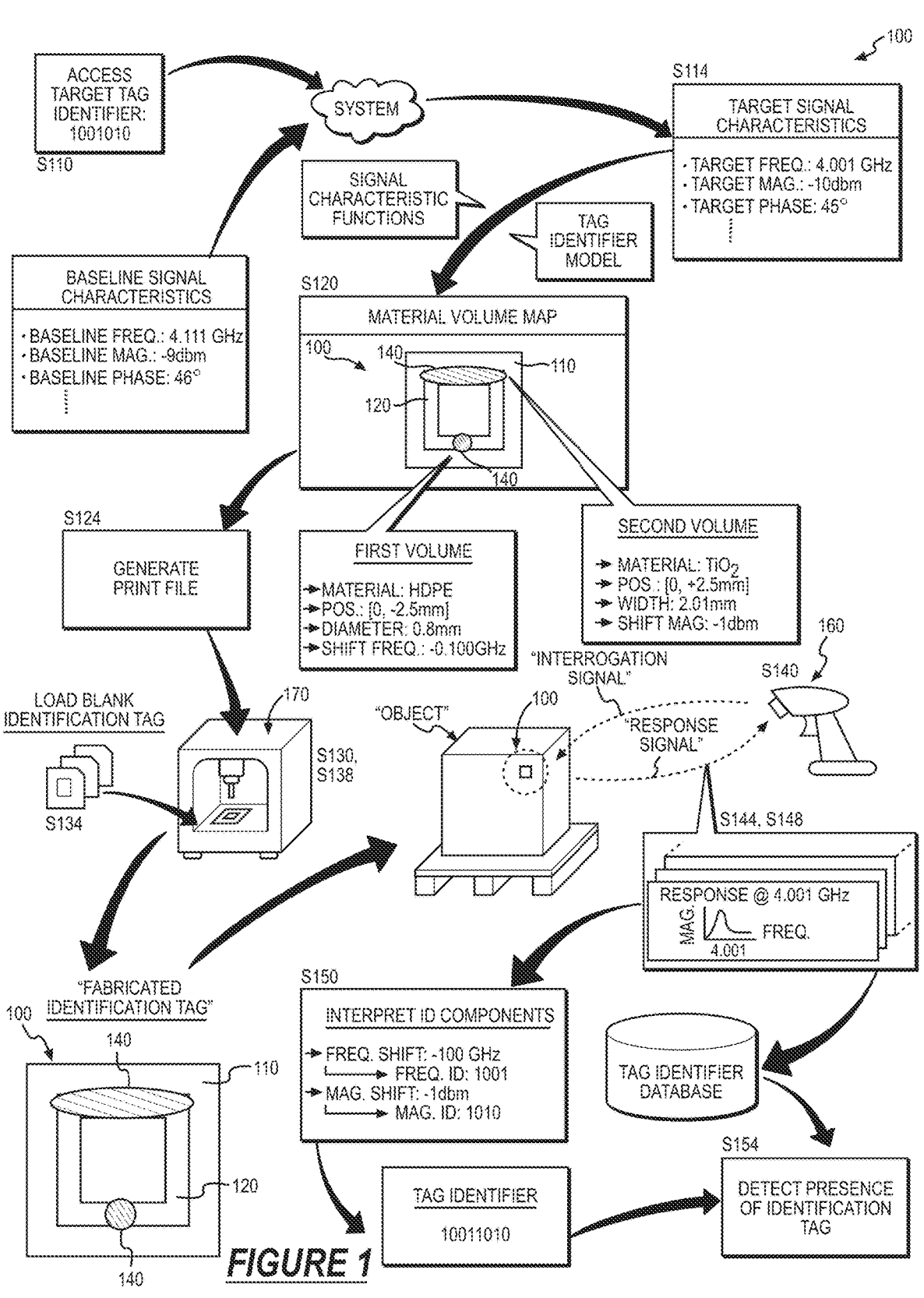
FIG. 1 is a flowchart representation of a method.

The following description of embodiments of the invention is not intended to limit the invention to these embodiments but rather to enable a person skilled in the art to make and use this invention. variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 2 and 6-10, an object identification management system for identifying and managing objects includes: an identification tag 100 configured to integrate with (e.g., affix to, embed within, locate on) an object; and a detector 160 configured to interrogate the identification tag 100.

The identification tag 100 includes: a substrate 110; a target resonator 120; and a set of volumes of a dielectric material arranged on the substrate 110 proximal to the target resonator 120. The target resonator 120 is: arranged on the substrate 110; characterized by a baseline resonant frequency; and configured to broadcast a response signal responsive to excitation by an interrogation signal. The set of volumes of the dielectric material are configured to shift a resonant frequency of the target response signal, broadcast by the target resonator 120 responsive to excitation by the interrogation signal, from the baseline resonant frequency by a target frequency difference that encodes an identification value of the identification tag 100.

The detector 160 includes: a transmitter configured to broadcast interrogation signals over a frequency band; a receiver configured to receive the target response signal passively broadcast by the identification tag 100; and a controller. The controller is configured to: detect a set of target radio frequency signal characteristics in the target response signal; for each signal characteristic, in the set of target radio frequency signal characteristics, interpret an identifier component corresponding to the signal characteristic; and detect presence of the identification tag 100 based on correspondence between the identifier components, corresponding to the set of target radio frequency signal characteristics, and the target tag identifier.

1.1 Variation: Identification Tag with Reference Resonator

As shown in FIGS. 5-11, one variation of the object identification management system includes: an identification tag 100 configured to locate on an object; and a detector 160 configured to interrogate the identification tag 100.

In this variation, the identification tag 100 includes: a substrate 110; a target resonator 120 arranged on the substrate 110 and configured to passively broadcast a target response signal responsive to excitation of the target resonator 120 by an interrogation signal; a reference resonator 130 arranged on the substrate 110 and configured to passively broadcast a reference response signal responsive to excitation of the reference resonator 130 by the interrogation signal; and a set of volumes of material 140 (e.g., a dielectric material, a conductive material, an insulative material and/or a combination thereof) arranged proximal the target resonator 120 and configured to modulate a baseline response signal of the target resonator 120 to passively broadcast the target response signal exhibiting a set of target radio frequency signal characteristics.

In this variation, the detector 160 is configured: to interrogate the identification tag 100 over a frequency band; to, for each frequency in the frequency band, record a response signal passively broadcast by the identification tag 100; to aggregate a response band representing each response signal passively broadcast by the identification tag 100 over the frequency band; to identify the reference response signal, in the response band, corresponding to the reference resonator 130; to identify the target response signal, in the response band, corresponding to the target resonator 120; to derive a normalized target response signal based on differences between the reference response signal and a baseline reference response signal of the reference resonator 130; and to interpret a tag identifier of the identification tag 100 based on the normalized target response signal.

2. Method

As shown in FIGS. 1-5, a method S100 includes: accessing a target tag identifier in Block S110; and deriving a set of target radio frequency signal characteristics that encode the target tag identifier in Block S114. The method S100 also includes transforming the set of target radio frequency signal characteristics into a map of volumes of a first dielectric material arranged proximal a target resonator 120 within an identification tag 100 to modulate a baseline response signal of the target resonator 120 to passively broadcast a target response signal exhibiting the set of target radio frequency signal characteristics in Block S120. The method S100 further includes generating a print file according to the map in Block S124.

2.1 Variation: Tag Database

As shown in FIGS. 2-5, one variation of the method S100 further includes: loading an identification tag 100 into a printer 170 in Block S134; accessing a print file including a map of volumes of dielectric material 140 arranged within the identification tag 100 in Block S130; and fabricating volumes of dielectric material 140, proximal a target resonator 120 within the identification tag 100, according to the print file in Block S138.

This variation of the method S100 also includes: broadcasting an interrogation signal over a frequency band via a detector 160 in Block S140; receiving a response signal passively broadcast by the identification tag 100 responsive to excitation of the target resonator 120 by the interrogation signal in Block S144; and deriving a set of radio frequency signal characteristics of the response signal of the identification tag in Block S164. This variation of the method S100 also includes: accessing a tag identifier for the identification tag 100 in Block S110; and storing the tag identifier, in association with the set of radio frequency signal characteristics, in a tag database in Block S166.

3. Applications

Generally, the identification tag 100, the detector 160, and a printer 170 cooperate to form an object identification management system (hereinafter referred to as a "system"). In particular, the identification tag 100: is configured for placement on an object (e.g., a pallet, shipping or storage container, an object, or packaging); includes a target resonator 120 configured to resonate and return a response signal when interrogated by an interrogation signal; and includes volumes of dielectric, conductive, and/or insulative material arranged in targeted locations, geometries, and amounts over the target resonator 120 to modify amplitude, frequency, phase, phase delay, and group delay of the target response signal returned (i.e., passively reflected) by the target resonator 120. For example, the volumes of material 140 can be formed from combinations of dielectric, conductive, or insulative material, such as a polymer-based material including traces of copper.

The detector 160 (e.g., a handheld detector, a fixed or stationary detector, a remote sensing satellite) is configured: to broadcast an interrogation signal (e.g., a series of radio frequency signals within a frequency band); to detect and record response signals returned by the identification tag 100; to interpret amplitude, frequency, phase, phase delay, and/or group delay of these response signals; and to interpret a (pseudo-) unique identifier (e.g., a 32-bit identifier) of the identification tag 100 based on the amplitude, frequency, phase, phase delay, and/or group delay of these response signals.

The printer 170 is configured to fabricate volumes of material 140 in target volumes, geometries, and positions over the target resonator 120 of an identification tag 100 in order to achieve target amplitude, frequency, phase, phase delay, and/or group delay of the target response signal passively broadcast by the identification tag 100—when interrogated—that can be converted into a (pseudo-) unique identifier (e.g., a 32-bit identifier) by the detector 160 (or other system in communication with the detector 160).

3.1 Identification Tag

In particular, the identification tag 100 includes: a set of (i.e., one or more) target resonators 120 (i.e., radio frequency resonators); and one or more volumes of material 140 (e.g., a dielectric material, a conductive material, an insulative material and/or a combination thereof) in known and/or controlled electrical permittivities, electrical conductivities, volumes, geometries, and positions over one or more of the target resonators 120. Thus, the volumes of material 140 function to shift the amplitude, frequency, phase, phase delay, and/or group delay of response signals returned by the identification tag 100 when interrogated by the detector 160. In particular, the volumes of material 140 can uniquely modulate the baseline resonant signal properties of a particular target resonator 120 or multiple target resonators 120, independent of the resonant signal properties of other target resonators 120.

The identification tag 100 can further include a set of (i.e., one or more) reference resonators 130 (i.e., radio frequency resonators). The identification tag 100 can exclude such materials over the reference resonators 130 such that, when interrogated by the same interrogation signals as the target resonator 120, the reference resonators 130 return reference response signals that exhibit frequency, amplitude, phase, phase delay, and/or group delay shifts resulting from radio frequency interactions with objects outside of the identification tag 100 and/or environmental conditions affecting the tag (e.g., temperature, humidity, orientation, or mechanical stress).

Accordingly, the detector 160 can: detect and record response signals from both the target and reference resonators 130; and normalize (or "calibrate") the target response from the target resonator 120 based on reference signals received from the reference resonators 130. Thus, the system can correct the target response signal for signal distortion introduced by environmental or object-related factors—such as temperature, humidity, orientation, or surrounding materials—that similarly affect both the target and reference resonators 130.

3.2 Tag Response Control and Interpretation

In particular, the target resonator 120 is overlaid with one or more volumes of material 140 (e.g., a dielectric material, a conductive material, an insulative material and/or a combination thereof)—exhibiting different electrical permittivity, permeability, and/or conductivity characteristics—that shift the frequency, amplitude, phase, phase delay, and/or group delay of a target response signal returned by the target resonator 120 when interrogated by the detector 160. The relationships between the amplitude, directional shift, and/or other characteristics of these signal characteristics and types, locations, volumes, and/or geometries of these materials applied over the target resonator 120 can be derived, such as empirically, through simulation, through regression, and/or through machine learning, etc. Furthermore, the detector 160 can execute a repeatable process for: correcting a target response signal received from the identification tag 100 based on reference response signals received from reference resonators 130 in the same identification tag 100; and converting shift in the frequency, amplitude, phase, phase delay, and/or group delay, such as from nominal or known characteristics of the target resonator 120, into components of a (pseudo-) unique tag identifier (e.g., a 28-bit or 64-bit binary string or value).

Thus, given specification or selection of a unique tag identifier, the system can generate a plan (e.g., a "print file") for depositing types, locations, volumes, and/or geometries of various materials over the target resonator 120 in a tag in order to achieve shifts in the frequency, amplitude, phase, phase delay, and/or group delay of a target response signal returned by this identification tag 100 when interrogated. The detector 160 can then interpret or transform these signal characteristics directly back into the unique tag identifier specified or selected for this identification tag 100.

The printer 170 (e.g., a dot-matrix printer 170) can execute this plan (or "print file") to automatically fabricate volumes of various materials at specific locations, volumes, and/or geometries over the target resonator 120.

Thus, the identification tag 100 can store a readable (pseudo-) unique tag identifier within a target resonator 120 and volumes (or "dots") of material rather than in integrated circuits or other discrete (e.g., surface mount) chips, capacitors, inductors, or resistors. In particular, the identification tag 100 can include volumes of common materials, such as epoxy-based mixtures or matrices including iron powder, aluminum-oxide powder, and graphite powder. The identification tag 100 can thus exclude rare and exotic materials found in integrated circuits, such as tantalum and cobalt. Accordingly, the identification tag 100 can be discarded, such as with a pallet or material packaging, without loss of exotic materials to a waste stream and without pressure to recycle such exotic materials. Therefore, the identification tag 100 can be fully disposable with (much) less negative impact on the environment.

3.3 Material Volume Configuration for Response Manipulation

The identification tag 100 can include one or more volumes of one or more materials that cooperate to shift characteristics of the signal response of the identification tag 100 in predictable modes. In particular, the system can select the characteristics (i.e., pattern, material, volume, location geometry) of these volumes of material 140 to—individually and/or in combination—predictably modify characteristics (e.g., frequency, amplitude, phase, phase delay, group delay) of a target response signal returned by the target resonator 120 when interrogated by the detector 160 such that the detector 160 can transform these characteristics of the target response signal into an accurate tag identifier assigned to the identification tag 100. For example, the identification tag 100 can include a first volume of dielectric material 140 arranged at a particular latitudinal and longitudinal position on the target resonator 120 such that the target resonant frequency of the target resonator 120 is reduced by 0.001 gigahertz (or "GHz") from a baseline resonant frequency of the target resonator 120 and such that the identification tag 100 returns a target response signal of peak amplitude when interrogated with a signal 0.001 GHz less than the baseline resonant frequency. The detector 160 can then interpret a first component of a unique identifier of the identification tag 100 based on (e.g., proportional to) this shift in resonant frequency.

Additionally or alternatively, the identification tag 100 can include a second volume of dielectric a different material (e.g., an epoxy containing aluminum oxide particles)—characterized by a relatively low conductivity and a relatively high permittivity—located over the target resonator 120 such that the amplitude of the target response signal returned by the target resonator 120 at this resonant frequency is reduced by 9%. The detector 160 can then interpret a second component of the unique identifier of the identification tag 100 based on (e.g., proportional to) this shift in amplitude of the target response signal when the identification tag 100 is interrogated at the resonant frequency.

The identification tag 100 can include similar volumes of material 140 that, individually or in combination, shift the phase, phase delay, and/or group delay of target response signals returned by the identification tag 100 when interrogated by the detector 160; the detector 160 can then receive, interpret, and transform these characteristics of target response signals returned by the identification tag 100 into additional components of the unique identifier of the identification tag 100 based on these signal characteristics.

3.4 Tag Identification

Generally, the detector 160 (e.g., including a radio frequency transmitter, receiver, and signal processor) can: broadcast interrogation signals over a band of frequencies (or a "frequency band"); detect and record inbound signals, some of which may be target response signals returned by target resonators 120 in the identification tag 100 as a result of excitation by these interrogation signals; isolate target response signals returned by the identification tag 100 from these inbound signals; derive characteristics (e.g., identification tag 100 resonant frequency, amplitude, phase, phase delay, group delay) of the target response signals; and then interpret a tag identifier corresponding to the identification tag 100 from these response signal characteristics.

In particular, the detector 160 can broadcast a series of interrogation signals characterized by a range of frequencies within the frequency band. For each interrogation signal at a particular frequency within the frequency band, the detector 160 can: record a target response signal passively broadcast by the identification tag 100; detect a set of target signal characteristics (e.g., a peak frequency, an amplitude at the peak frequency) in the response signal; and translate the set of target signal characteristics into a tag identifier (e.g., a 28-bit binary string or value).

Thus, the detector 160 can identify the identification tag 100 by broadcasting radio frequency interrogation signals and interpreting a tag identifier from characteristics of a radio frequency response passively broadcast by the identification tag 100 when energized by such interrogation signals, thereby identifying presence and identity of the identification tag 100 without direct line-of-sight to the identification tag 100, without specific knowledge of the location of the identification tag 100, and without necessity for a separate power supply at the identification tag 100, and without incorporation of integrated circuits or other electronics "chips" within the identification tag 100.

For example, the detector 160 can: broadcast a series of interrogation signals over a frequency band between 2.000 GHz to 5.000 GHz (e.g., in 0.001 GHz steps); record a series of response signals (or a "response band") passively broadcast by the identification tag 100 as a result of the interrogation signals energizing the target resonator 120; identify a target resonant frequency of the identification tag 100 at 4.215 GHz corresponding to a peak amplitude of a target response signal returned by the identification tag 100; calculate a frequency offset of 2.215 GHz from a baseline resonant frequency of 2.000 GHz; convert the 2.215 GHz offset into a 12-bit binary value of "100010100111"; and insert the binary value into a first position of a 28-bit tag identifier.

Additionally, in the preceding example, the detector 160 can: measure a peak response signal amplitude of 100 millivolts at the target resonant frequency; calculate an attenuation of 100 millivolts from a baseline amplitude of 200 millivolts; convert the attenuation into an 8-bit binary value of "1100100"; and append the binary value into a second position of the 28-bit tag identifier.

The detector 160 can then repeat this process for each signal characteristic (i.e., phase shift, phase delay, and group delay) to concatenate the set of identifiers into the 28-bit binary string. Therefore, the detector 160 can derive characteristics of the target response signal—passively broadcast by the identification tag 100—that encode components of a (pseudo-) unique identifier of the identification tag 100.

3.5 Reference Resonators

In one variation, the identification tag 100 also includes a set of (i.e., one or more) reference resonators 130 that similarly return reference signals when interrogated by the detector 160. However, the identification tag 100 can exclude additional volumes of material 140 located over the reference resonators 130 such that reference signals returned by the reference resonators 130 when interrogated—and intercepted and recorded by the detector 160—are affected by external objects near the identification tag 100 and the detector 160 and/or environmental conditions affecting the tag (e.g., temperature, humidity, orientation, or mechanical stress).

Thus, given a priori information regarding characteristics of the reference resonators 130 (e.g., their baseline frequencies), the detector 160 can correct (or "normalize") target response signals returned by the target resonator 120 when interrogated over the frequency band. In particular, variations in the cover layer 150, proximity of objects near the identification tag 100, and characteristics of an object on which the identification tag 100 is applied may be unpredictable but may equally or similarly affect reference and target response signals returned by the reference and target resonators 120 in the identification tag 100 when interrogated by the detector 160. The detector 160 can thus remove signal processing and interpretation error in the target response signal based on differences between received reference signals and stored (i.e., baseline) characteristics of the reference resonators 130.

For example, the identification tag 100 can include: a lower reference resonator 130 tuned to a baseline reference resonant frequency of 2.000 GHz; an upper reference resonator 130 tuned to a baseline reference resonant frequency of 5.000 GHz; and a target resonator 120 tuned to a baseline resonant frequency of 4.215 GHz.

In this example, the detector 160 can: broadcast a series of interrogation signals over the frequency band between 1.900 GHz to 5.100 GHz; record response signals passively broadcast by the resonators; and detect three resonant frequencies exhibiting peak response amplitudes at 1.977 GHZ, 4.201 GHz, and 4.991 GHz in these response signals. Given the –0.023 GHz and –0.009 GHz shifts in resonant frequencies of the lower and upper reference resonators 130 from their known 2.000 GHz and 5.000 GHz baseline frequencies, the detector 160 can correct the 4.201 GHz target resonant frequency of the target resonator 120 to 4.215 GHz, such as via linear interpolation. The detector 160 can implement similar methods and techniques to correct (or "normalize") phase, phase delay, and group delay characteristics of the target resonator 120 similarly derived from the response signals returned by the identification tag 100. For example, the detector 160 can execute similar methods and techniques by an application (e.g., a cloud-based application) executing on a computer network (e.g., a remote server) in conjunction with the application and the computer network.

Furthermore, the detector 160 can leverage a shift in a first resonant signal property to normalize a second resonant signal property. For example, the detector 160 can: normalize the resonant frequency of the target response signal; and normalize the amplitude of the target response signal based on the normalized resonant frequency and a function relating the resonant frequency and amplitude shifts.

Therefore, the identification tag 100 can include one or more reference resonators 130 of known reference signal characteristics, and the detector 160 can correct the target response signal received from the identification tag 100 based on differences between real and baseline reference response signal characteristics of these reference resonators 130. By normalizing the target response signal, the detector 160 can accurately convert the target response signal passively broadcast by the target resonator 120 into a unique identifier, even under dynamic and unpredictable environmental conditions, identification tag 100 wear, and/or damage, etc.

3.6 Tag Generation: User-Specified Tag Identifier

Furthermore, the printer 170 (or other computer system, application, etc.) can: receive a user-specified tag identifier, such as at a user interface; and translate this tag identifier into a "pattern" of dielectric types, volumes, positions, and geometries proximal a target resonator 120 that affect signal characteristics of the target resonator 120 such that the target response signal—returned by the target resonator 120 when interrogated over the frequency band by the detector 160—can be directly converted (or "decoded") back into the user-specified tag identifier by the detector 160 given predefined signal processing schemes.

For example, the printer 170 (or other computer system, application, etc.) can store functions or models that return volumes, positions, and geometries of particular dielectric types—loaded into the printer 170—given a complete or partial tag identifier. The printer 170 can then: receive a user-specified tag identifier; implement these functions or models to convert the user-specified tag identifier into a print file that defines application of volumes, positions, and geometries of particular dielectric types; and execute this print file to fabricate an identification tag 100 containing dielectrics of these types, volumes, positions, and geometries proximal the target resonator 120. In one variation, the printer 170 can then laminate a cover layer 150 over the target resonator 120 and volumes of material 140 to complete the identification tag 100. Thus, the system can converge on a particular configuration (e.g., pattern, material, dimension) of volumes of material 140 (e.g., from a population of viable patterns and/or materials) configured to manipulate the resonant signal properties of the target resonator 120 to encode the user-specified tag identifier.

3.7 Tag Generation: Pseudo-Random Tag Configurations

In one variation, rather than generating a map of material volumes based on a user-selected (i.e., predefined) tag identifier, the system can: pseudo-randomly generate a unique map of material volumes; fabricate an identification tag 100 according to the pseudo-random configuration (e.g., pseudo-random dimensions, materials, and/or pattern) of material volumes; visually inspect the identification tag 100 to derive signal characteristics of the target resonator 120 based on the detected dielectric material configuration (e.g., size, position, and material type of each volume of material 140) of the fabricated identification tag 100; and retroactively assign a tag identifier to a pseudo-randomly generated identification tag 100 by linking the derived signal characteristics to a tag identifier post-fabrication.

In particular, the system can: pseudo-randomly select a tag identifier or receive a user-specified tag identifier; and store the tag identifier in association with the derived signal characteristics in a tag database containing signal characteristics mapped to tag identifiers. Thus, the detector 160 can interpret the tag identifier of an identification tag 100 by directly interpreting signal characteristics of the response signal passively broadcast by the tag, without requiring foreknowledge of the tag configuration or predefined signal mapping. By pseudo-randomly generating identification tags 100 and associating derived signal characteristics with a tag identifier following tag fabrication, the system can rapidly expand a quantity of distinguishable tag configurations without requiring precomputed material layouts. For example, the system can rapidly generate a population of identification tags 100 for a large-scale production facility that requires: a high volume of uniquely distinguishable identification tags 100 that can be fabricated on-demand; and/or variability or unpredictability in tag structure or signal response (e.g., for anti-counterfeiting, serialized labeling, or limited-run object tracking).

3.8 Resonator Types

The identification tag 100 is described herein as including: a single E-shaped target resonator 120 (or "E-resonator"); and two E-shaped reference resonators 130. However, the identification tag 100 can include any quantity of target resonators 120 uniquely modified by volumes of various materials (e.g., a dielectric material, a conductive material, an insulative material and/or a combination thereof) and any quantity of reference resonators 130 excluding the volumes of material 140. Additionally or alternatively, the identification tag 100 can include resonators of any other type or geometry (e.g., E-shaped, circular, hexagonal), thus expanding the possible material volume patterns (and unique tag identifiers).

3.9 Additive and Subtractive Fabrication

The printer 170 is described herein as a printer 170 configured to: access a print file including a map of volumes of dielectric material 140 arranged within the identification tag 100; and fabricate the identification tag 100 according to the print file. For example, the printer 170 can: access a print file defining regions within the identification tag 100 for selective addition and/or subtraction of material by the printer (e.g., an additive printer, a subtractive printer, or a hybrid printer combining both additive and subtractive capabilities); selectively apply volumes of material 140 onto the identification tag 100 (e.g., via pipetting, or inkjet deposition) according to the print file; and/or selectively remove regions of material from a layer of material (e.g., via laser etching, milling, ablation, or chemical removal techniques) according to the print file.

4. Identification Tag

Generally, the identification tag 100 is configured to (transiently) locate on an object, such as a pallet, a shipping or storage container, an object, or packaging. The identification tag 100 stores a tag identifier in the form of: a target resonator 120 that resonates and passively broadcasts (e.g., broadcasts) a radio frequency response when energized by a radio frequency interrogation signal; and one or more dielectrics in controlled volumes, locations, and geometries, which modify the baseline radio frequency response (e.g., resonator frequency, resonance amplitude or attenuation, phase, phase delay, group delay) of the target resonator 120 when interrogated by radio frequency interrogation signals over the frequency band.

As shown in FIGS. 1, 5, 10, and 11, the identification tag 100 includes: a substrate 110; a set of (i.e., one or more) resonators (e.g., target resonators 120 and/or reference resonators 130) arranged on the substrate 110; and one or more volumes of material 140 arranged on the substrate 110. In particular, the substrate 110 can include a printed circuit board or flexible substrate 110 configured to support electrical and material components of the identification tag 100. The substrate 110 can define mounting regions for one or more resonators and corresponding volumes of material 140. In one example, the substrate 110 can include a flexible backing (e.g., paper, fiberglass, or polyimide) including: a first side forming a mounting surface for the set of resonators and volumes of material 140; and a second side including an adhesive layer configured to transiently adhere the identification tag 100 to an object, such as packaging, a pallet, or a shipping container.

4.1 Resonators

Generally, the identification tag 100 includes one or more resonators (i.e., forming an equivalent RLC circuit) configured to passively broadcast the response signals in response to excitation of the resonators by an interrogation signal. In particular, each resonator can define: a conductive trace (i.e., a conductive path); and a set of gaps extending between the traces and forming capacitive regions. Furthermore, each resonator can be at least partially formed from a conductive material (e.g., silver, gold, platinum, aluminum, copper, tin). Additionally, the identification tag 100 can include resonators of any type or geometry (e.g., E-shaped, circular, hexagonal), thereby expanding possible dielectric material configurations (and unique tag identifiers).

4.1.1 Target Resonators

In one implementation, the identification tag 100 can include a set of (i.e., one or more) target resonators 120, each target resonator 120 overlaid (or "manipulated") by volumes of material 140 and configured to passively broadcast a target response signal to identify the identification tag 100.

In particular, a target resonator 120 can passively broadcast a baseline response signal responsive to excitation of the target resonator 120 by an interrogation signal in absence of applied volumes of material 140. Alternatively, when dielectric material is arranged proximal the target resonator 120, the target resonator 120 modulates the baseline response signal to passively broadcast a target response signal encoding a set of target radio frequency signal characteristics. In one variation, the target resonator 120 is arranged on a substrate 110, and the dielectric material is applied proximal the target resonator 120 to shift one or more radio frequency signal characteristics of the baseline response signal, such as frequency, amplitude, or phase.

Furthermore, each target resonator 120 can be configured to passively broadcast a unique set of signal properties, such that the target response signal passively broadcast by the identification tag 100 includes a quantity of unique signal properties (e.g., unique resonant frequencies) corresponding to the quantity of target resonators 120. In one example, the identification tag 100 includes ten target resonators 120. In this example, a target response signal passively broadcast by the identification tag 100 includes ten unique resonant frequencies.

Each target resonator 120 can be selectively tuned, such that the target resonator 120 reflects only an interrogation signal with a particular amplitude, phase, and/or frequency. For example, the target resonator 120 can be configured (i.e., charged) to selectively reflect the interrogation signal, such as by altering the internal parameters of the target resonator 120 (e.g., capacitance or inductance), or forming the target resonator 120 from a material exhibiting nonlinear properties (e.g., ferroelectric materials, varactor diodes, or nonlinear optical materials). Therefore, the identification tag 100 can include a set of selectively-tuned resonators, each configured to reflect a unique subset of the interrogation signal. Accordingly, the tag can encode a broader range of identifiers by expanding the dimensionality of the reflected radio frequency signal.

4.1.2 Reference Resonators

In one variation, the identification tag 100 can include a set of (i.e., one or more) reference resonators 130, each reference resonator 130 excluding the volumes of material 140 and configured to passively broadcast a reference response signal. In particular, the reference resonator 130 is not overlaid or manipulated by volumes of material 140. Therefore, the system can attribute any deviation in the reference response signal (i.e., relative to a known reference baseline) to environmental conditions affecting the tag (e.g., temperature, humidity, orientation, or mechanical stress). Furthermore, each resonator within an identification tag 100 can be exposed to identical external conditions (e.g., ambient conditions, physical damage, orientation). Accordingly, the system can normalize the target response signal by referencing the corresponding signal characteristics of the reference response signal. Thus, the system can leverage the reference resonators 130 to correct target response signals based on shared exposure conditions, thereby increasing accuracy and reliability of tag identification under variable external influences.

4.2 Material Volumes

Generally, the identification tag 100 includes volumes of material 140 arranged proximal the target resonator 120 and configured to modulate the baseline response signal of the target resonator 120, such that the identification tag 100 passively broadcasts a unique radio frequency response signal for identifying the particular identification tag 100. In particular, the system can select characteristics (i.e., pattern, material, volume, and/or polarization) of the volumes of material 140, such that the identification tag 100 can passively broadcast a target response signal exhibiting a set of unique radio frequency signal characteristics (i.e., frequency, amplitude, phase, phase delay, and/or group delay).

In one implementation, the identification tag 100 includes a set of (i.e., one or more) volumes of material 140 arranged in a particular configuration. In particular, the configuration can define: a quantity of discrete volumes of material 140 (or "discrete volumes"); a shape of each discrete volume (e.g., a dot-shaped volume, a line-shaped volume); and a position of each discrete volume. For example, the position of each discrete volume can be defined by: a coordinate system (e.g., a longitudinal and latitudinal position) defined for the identification tag 100; a position relative to the traces and/or gaps of the target resonator 120 (e.g., disposed adjacent a gap between the trace, disposed between adjacent resonators, disposed near a left side of the target resonator 120); and/or a position relative to an adjacent discrete volume (e.g., overlapping the adjacent discrete volume).

Additionally, each volume of material 140 defines a geometric volume including a thickness and a surface area contacting the target resonator 120. For example, the identification tag 100 can include discrete volumes of material 140, where each discrete volume exhibits dimensions similar to dimensions adjacent discrete volumes or different from dimensions adjacent discrete volumes.

Each volume of material 140 can be formed from a material (e.g., a dielectric material, a conductive material, an insulative material and/or a combination thereof), such as a polymer-based material, a resin-based material, or any other dielectric, conductive, or insulative material and/or a combination thereof (i.e., a hybrid material). For example, the material can be polyethylene terephthalate (PET), high-density polyethylene (HDPE), carbon black, titanium dioxide, an epoxy-based material including trace elements (e.g., carbon, ceramic, metallic, ferrous), a porous polymer, a PTFE-based composite, and/or pure copper. Furthermore, each volume of material 140 can be formed from a single material or a hybrid combination of materials. For example, the identification tag 100 can include discrete volumes of material 140, where each discrete volume 140 can be formed from the same material as adjacent discrete volumes 140 or a different material than adjacent discrete volumes 140.

In one example, the system can select different materials for the volumes of material based on effects of these materials on distinct signal characteristics. In this example, the identification tag 100 includes: a first volume of a first dielectric material configured to shift a baseline resonant frequency of the target resonator 120 to a target resonant frequency; and a second volume of a second dielectric material, different from the first dielectric material, configured to shift a baseline amplitude, at the baseline resonant frequency of the target resonator 120, to a target amplitude at the target resonant frequency. Therefore, the system can generate an array of identification tags 100 by varying combinations of volume material, placement, and geometry to generate unique target response signals that encode a broad range of tag identifiers.

4.3 Cover Layer

In one variation, the identification tag 100 further includes a cover layer 150 configured to enclose the resonators and the volumes of material 140 over the substrate 110. In particular, the cover layer 150 can protect the resonators and the volumes of material 140 from damage, such as abrasion, chemical exposure, or environmental degradation (e.g., moisture, heat, UV radiation). Thus, the cover layer 150 preserves the original signal characteristics of the identification tag 100 by preventing degradation of the signal-reflecting components (i.e., the resonators 120, 130 and volumes of material 140).

In one example, the cover layer 150 is formed from an acrylic material (e.g., high density polyethylene or polyurethane) exhibiting a low dielectric constant (e.g., 2.6-3.2) and is uniformly applied across the target resonator 120 and volumes of material 140. In this example, the cover layer 150 encapsulates and protects the resonators and volumes of material 140 while imposing minimal impacts to the resonant signal properties of the identification tag 100, even when applied to uneven surfaces (e.g., on an irregular surface).

5. Detector

The detector 160 includes: a transmitter configured to broadcast interrogation signals over a frequency band; a receiver configured to receive the response signals passively broadcast by the identification tag 100; and a controller. For example, the transmitter can broadcast a set of interrogation signals characterized by incremental frequency steps spanning the frequency band (e.g., 2.000 GHz to 5.000 GHz in 0.001 GHz steps). The receiver can then record inbound signals at each detection frequency and isolate the set of response signals corresponding to each resonator 120, 130 within the identification tag 100.

The controller is configured to: access the set of response signals recorded by the receiver; identify one or more target response signals corresponding to target resonators 120 based on known baseline resonator characteristics and/or signal power thresholds; and detect a set of target radio frequency signal characteristics in each target response signal. In particular, the set of target radio frequency signal characteristics can include: a target resonant frequency; an amplitude at the target resonant frequency; a phase offset at the target resonant frequency; a phase delay; and/or a group delay. For example, the controller can derive these target radio frequency signal characteristics via signal processing operations, such as Fourier transform analysis, phase demodulation, and/or peak tracking over the response band.

For each target signal characteristic, the controller is further configured to interpret an identifier component corresponding to the target signal characteristic. In one implementation, the controller can: calculate a difference between the target signal characteristic and a baseline signal characteristic associated with the corresponding target resonator 120; and transform this difference into a binary value representing an identifier component. The controller can then aggregate multiple identifier components into a tag identifier of the identification tag 100. For example, the controller can: transform a 0.005 GHz shift in resonant frequency into a 12-bit binary value representing a location code; and transform a 20% amplitude attenuation into an 8-bit binary value representing an expiration status. The controller can then assemble these values into a composite tag identifier corresponding to the object on which the identification tag 100 is arranged.

Additionally or alternatively, the controller can access a tag database mapping known signal characteristics to previously-stored tag identifiers. In this variation, the controller can: query the tag database based on the set of detected target signal characteristics; and identify the tag identifier of the identification tag 100 based on a match or nearest-neighbor correlation to stored signal profiles. Thus, the detector 160 can identify the presence and identity of the identification tag 100 by interpreting signal characteristics of the target response signal, without requiring integrated electronics or active signaling from the identification tag 100.

6. Signal Characteristics

Generally, the identification tag 100 can passively broadcast a unique radio frequency response signal exhibiting a set of target radio frequency signal characteristics (or "target signal characteristics") that encode a target tag identifier of the identification tag 100. In the following examples, an identification tag 100 includes: a substrate 110; a target resonator 120 (e.g., an "E-shaped" resonator) disposed on the substrate 110; and volumes of material 140 disposed on the target resonator 120. In particular, the identification tag 100 includes a target E resonator 120 (i.e., an "E-shaped" resonator) defining a trace including: a spine extending in a vertical direction and positioned proximal a left side of the target resonator 120; and an upper, middle, and lower line each extending in a horizontal direction from an upper end, midpoint, and lower end of the spine, respectively. The resonator further defines a set of gaps extending between the lines of the trace.

In the following examples, the system selects the characteristics of the volumes of material 140 (i.e., pattern, material, volume, and/or polarization), such that: the volumes of material 140 modulate the baseline signal characteristics (i.e., baseline resonant frequency, amplitude, phase, phase delay, and/or group delay) of the baseline response signal of the target E resonator 120; and the target E resonator 120 passively broadcasts a target response signal, exhibiting a set of target radio frequency signal characteristics, responsive to an interrogation signal.

6.1 Resonant Frequency

In one variation, the system selects the characteristics of the volumes of material 140, such that the volumes of material 140 modulate the baseline resonant frequency of the baseline response signal. In particular, in this variation, the detector 160 can: broadcast an interrogation signal, at a first frequency, to the identification tag 100; and receive a response signal at a second frequency, different from the first frequency, from the identification tag 100.

6.1.1 Pattern

Figure 6:
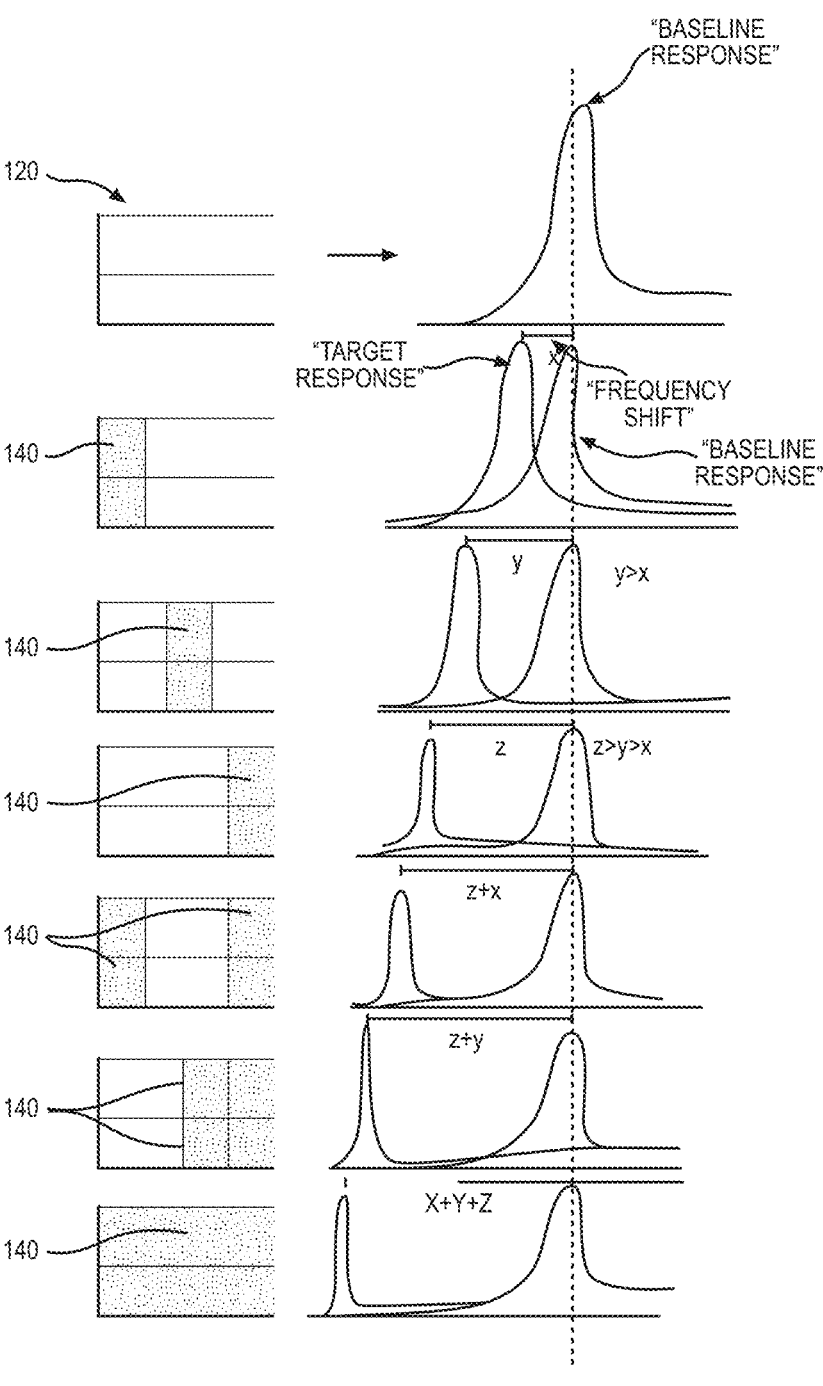
FIG. 6 is a schematic representation of a system.

In one variation, the identification tag 100 can include a set of volumes of material 140 arranged in a pattern to predictably modulate (i.e., increase or decrease) the baseline resonant frequency of the baseline response signal, as shown in FIG. 6. In one example, the identification tag 100 includes a volume of dielectric material 140 adjacent the spine of the target E resonator 120, such that the volume of dielectric material 140 extends between the upper end and the lower end of the spine. In this example, the volume of dielectric material 140 reduces the baseline resonant frequency of the baseline response signal by a first frequency shift.

In another example, the identification tag 100 includes a volume of dielectric material 140: deposited proximal a right side of the target E resonator 120; and extending coaxially with the spine, such that the volume of dielectric material 140 extends between the upper line and the lower line, traversing the set of gaps and the middle line. In this example, the volume of dielectric material 140 reduces the baseline resonant frequency of the baseline response signal by a second frequency shift (e.g., different from the first frequency shift).

6.1.2 Volume

Figure 7:
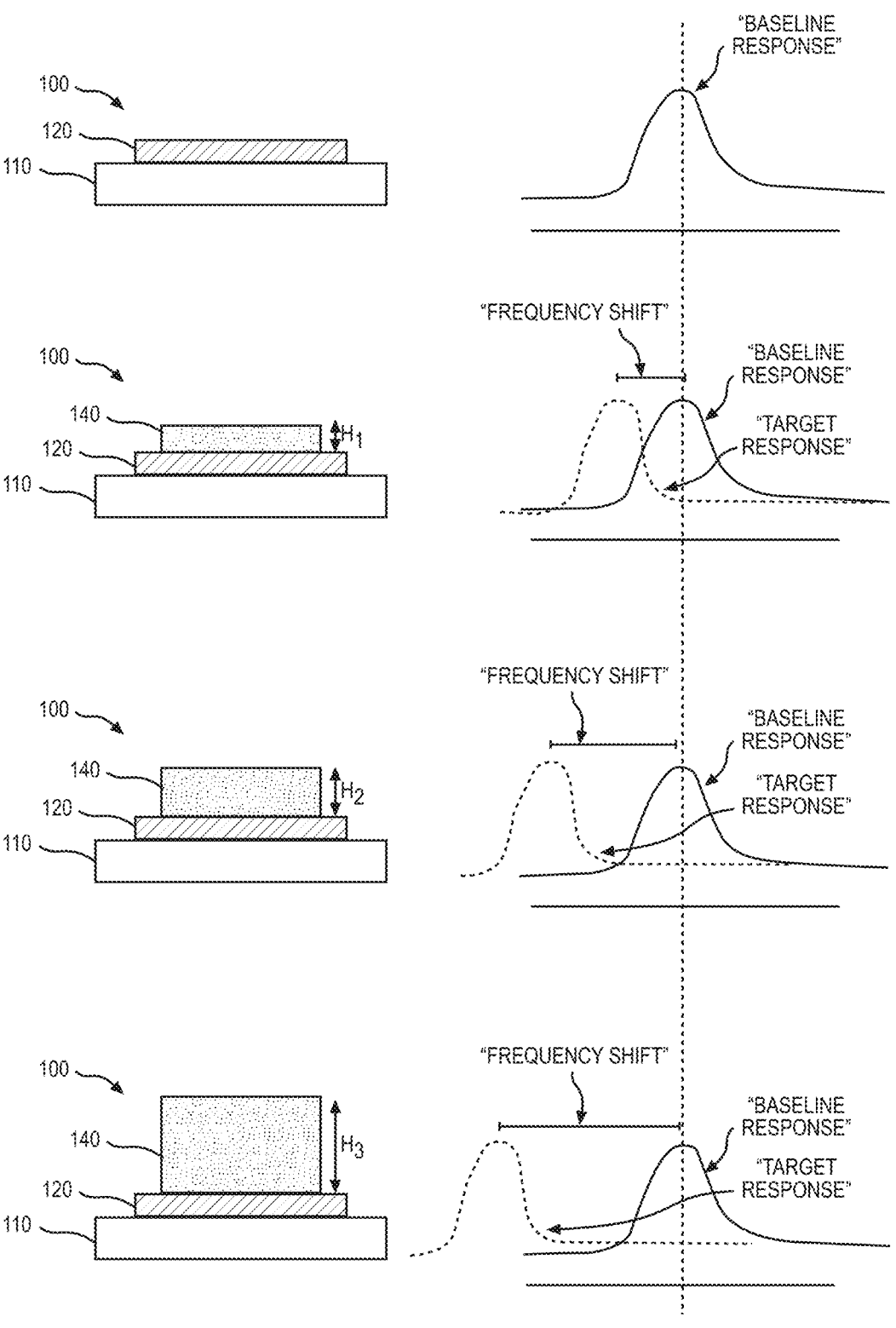
FIG. 7 is a schematic representation of one variation of the system.

In another variation, the system selects the geometric volume (i.e., thickness and/or surface area) of each volume of material 140, such that the volumes of material 140 modulate the resonant frequency of the target response signal, as shown in FIG. 7. In one example, the identification tag 100 includes a first volume of dielectric material 140: deposited on the target E resonator 120 such that the first volume of dielectric material 140 spans the entirety of the target E resonator 120; and defining a first thickness (e.g., five micrometers). In this example, the first volume of dielectric material 140 reduces the baseline resonant frequency of the baseline response signal by a first frequency shift.

In another example, the identification tag 100 includes a second volume of dielectric material 140: deposited on the target E resonator 120 such that the second volume of dielectric material 140 spans the entirety of the target E resonator 120; and defining a second thickness (e.g., ten micrometers) greater than the first thickness. In this example, the second volume of dielectric material 140 reduces the baseline resonant frequency of the baseline response signal by a second frequency shift (e.g., greater than the first frequency shift).

6.1.3 Material

Figure 8:
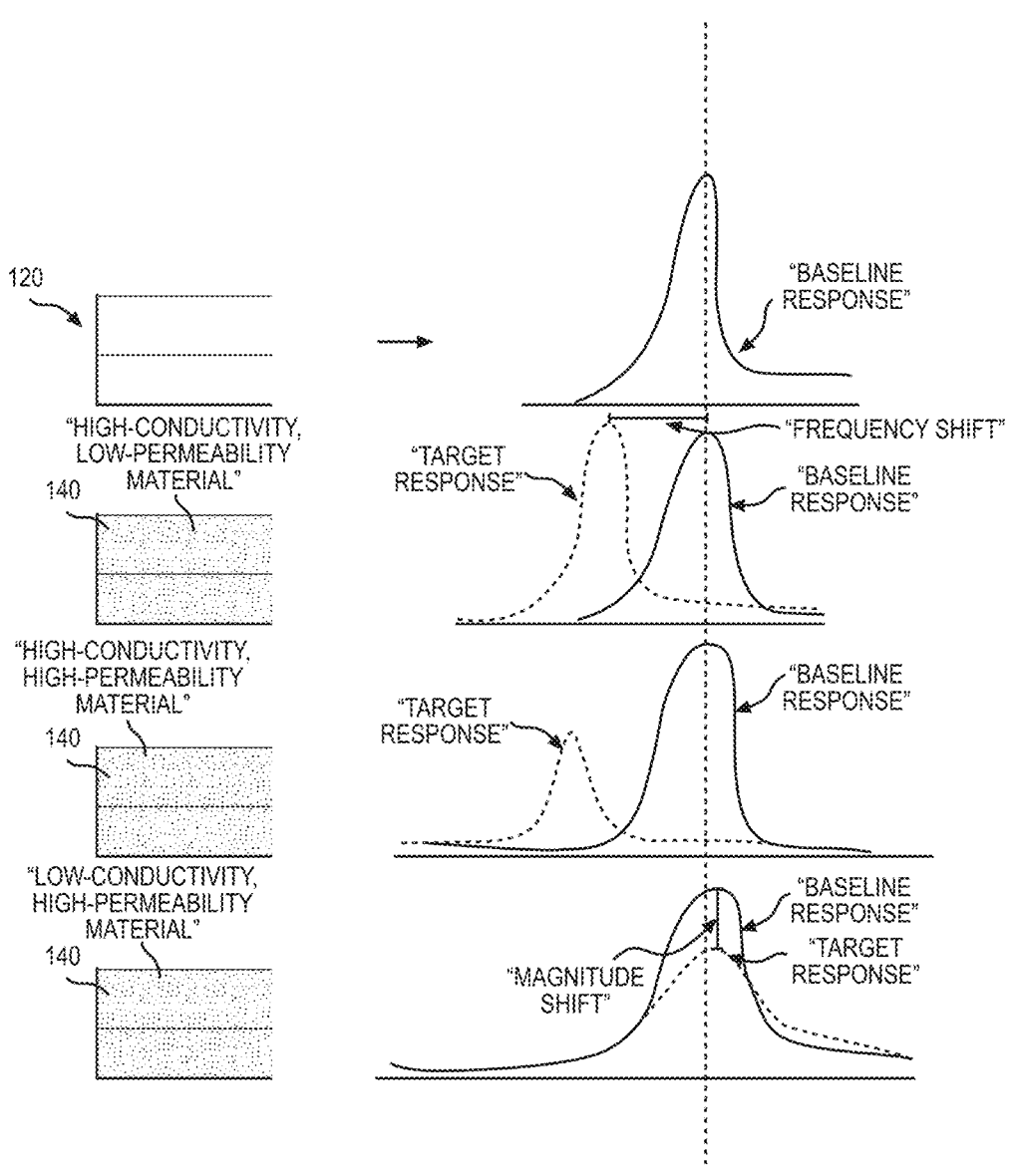
FIG. 8 is a schematic representation of one variation of the system.

In one variation, the system selects the material of each volume of material 140, such that the volumes of material 140 modulate the resonant frequency of the target response signal, as shown in FIG. 8. In particular, the system can select the material properties (e.g., dielectric constant, conductivity, permittivity, polarity) of each volume of material 140. In one example, the identification tag 100 includes a first volume of a first dielectric material: deposited on the target E resonator 120 such that the first volume of the first dielectric material spans the entirety of the target E resonator 120; and formed from the first material characterized by a relatively high conductivity and a relatively low permittivity. In this example, the first volume of the first dielectric material reduces the baseline resonant frequency of the baseline response signal by a first frequency shift.

Figure 9:
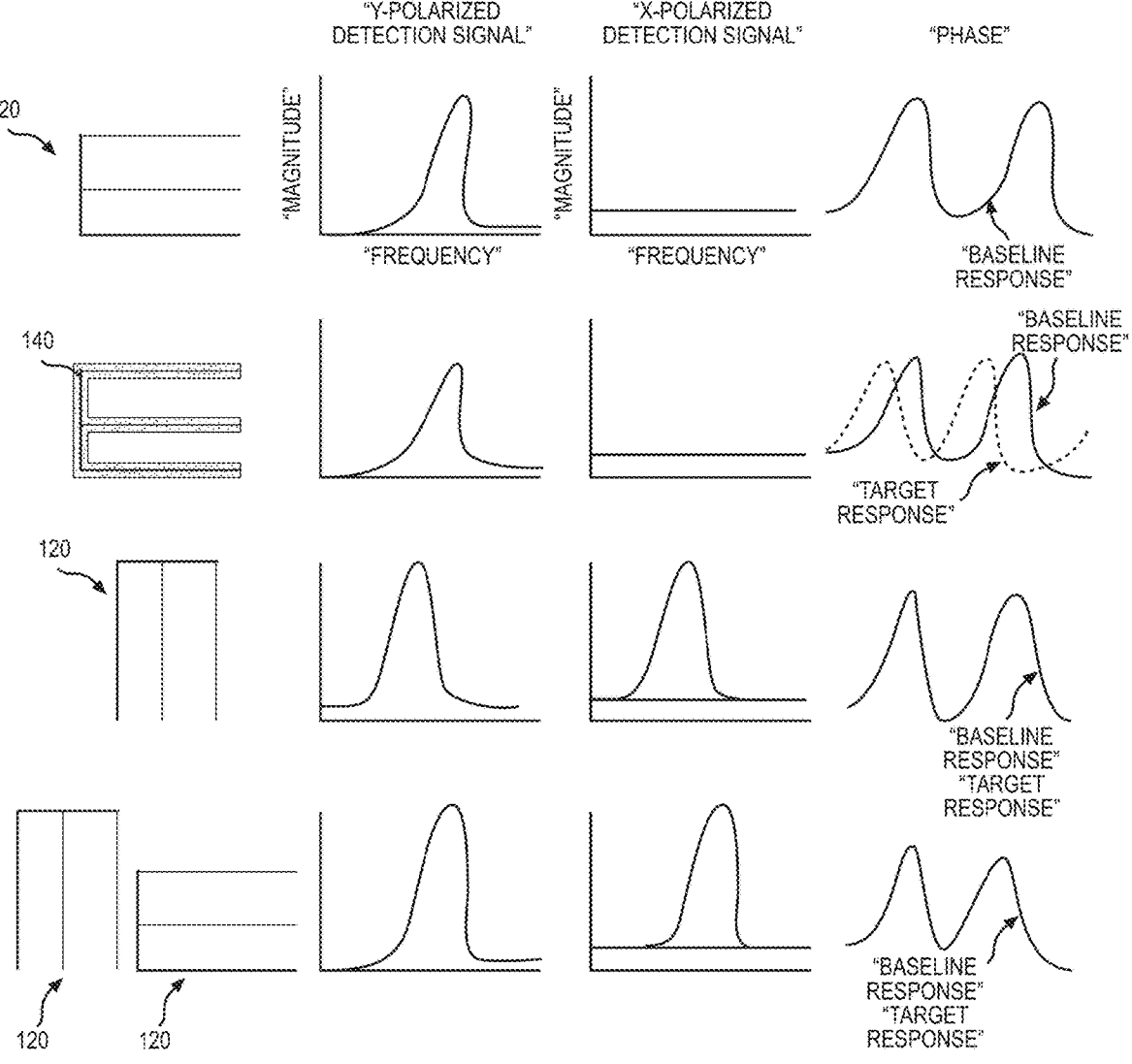
FIG. 9 is a schematic representation of one variation of the system.
Figure 10:
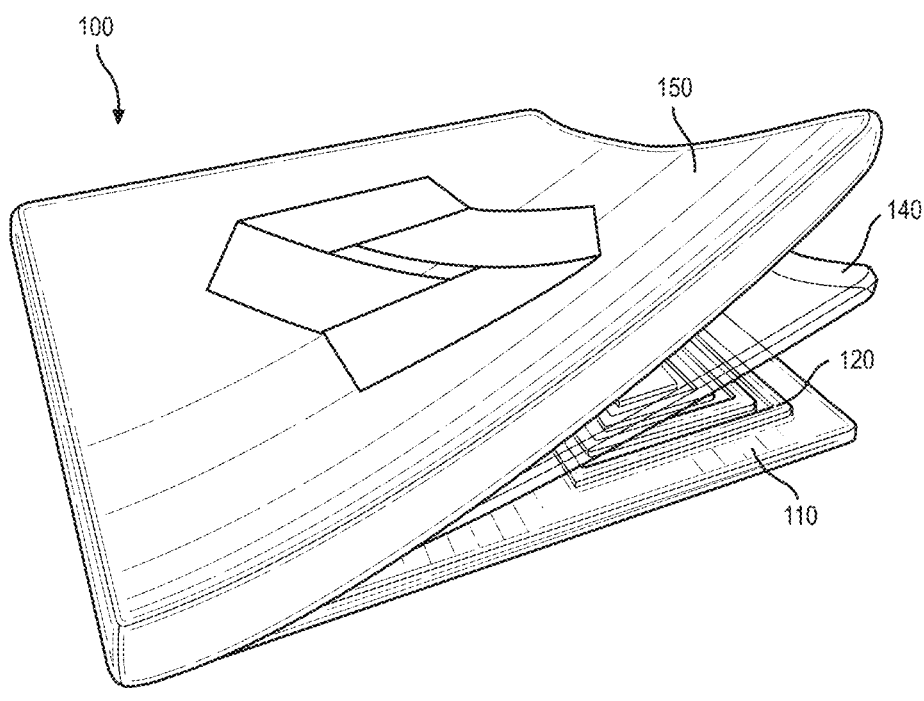
FIG. 10 is a schematic representation of one variation of the system.
Figure 11:
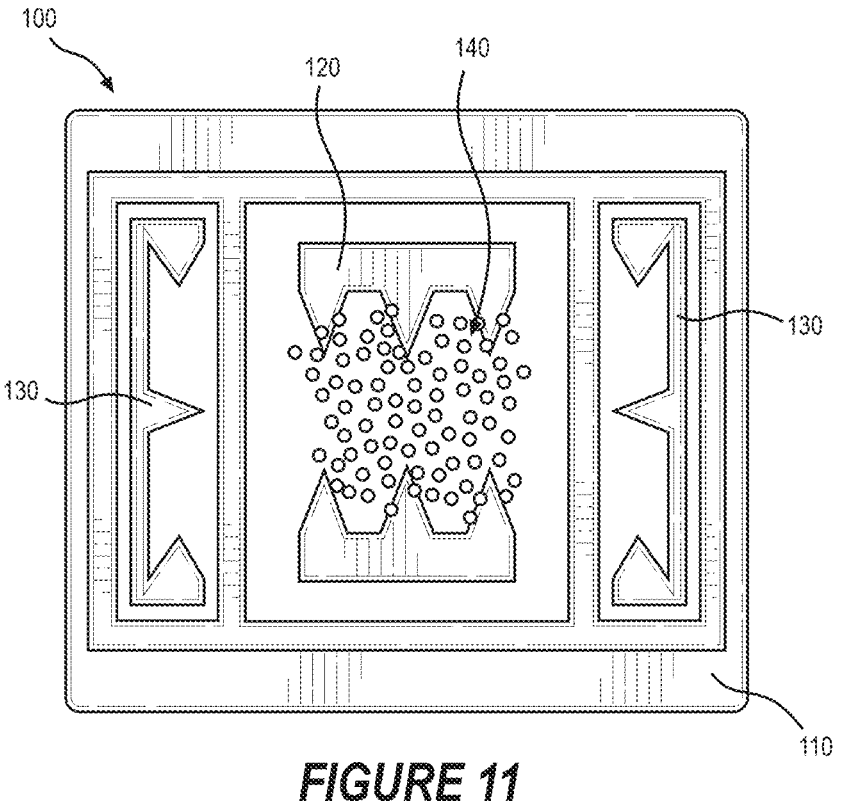
FIG. 11 is a schematic representation of one variation of the system.

In another example, identification tag 100 includes a second volume of a second dielectric material: deposited on the target E resonator 120 such that the second volume of dielectric material 140 spans the entirety of the target E resonator 120; and formed from the second material, such as a polarity-selective material (i.e., a material reflecting only an interrogation signal with a particular amplitude, phase, frequency), as shown in FIG. 9.

6.2 Response Amplitude

In one variation, the system selects the characteristics (e.g., dimensions, pattern, material) of the volumes of material 140, such that the volumes of material 140 modulate the amplitude of the target response signal. In particular, the amplitude of the target response signal is interpreted based on a ratio between the amplitude of the baseline response signal and the amplitude of the target response signal.

In one example, the target resonator 120 exhibits a baseline response signal with an amplitude of 0.84 at a target frequency of 3.950 GHz, in the absence of applied material. In this example, the target resonator 120 exhibits a target response signal exhibiting a reduced amplitude of 0.42 at the same frequency (i.e., induced by a volume of dielectric material 140 arranged over the target resonator 120). The detector can then implement methods and techniques described above to interrogate the identification tag and interpret an amplitude ratio (i.e., 0.42/0.84=0.5) encoding a binary value of '1'.

In another example, the identification tag 100 includes a volume of dielectric material 140: deposited on the target E resonator 120 such that the volume of dielectric material 140 spans the entirety of the target E resonator 120; and formed from a material characterized by a relatively low conductivity and a relatively high permittivity (e.g., an epoxy-based material including aluminum oxide particles) to reduce the baseline amplitude of the baseline response signal. In another example, the identification tag 100 includes a volume of dielectric material 140 deposited on the target E resonator 120 such that the volume of dielectric material 140 traverses the set of gaps to increase the baseline amplitude of the baseline response signal.

6.3 Phase Characteristics

In one variation, the system selects the characteristics (e.g., dimensions, pattern, material) of the volumes of material 140, such that the volumes of material 140 modulate the phase characteristics (e.g., phase shift, phase delay, group delay) of the target response signal. For example, the system can select a material characterized by a relatively high dielectric constant to increase the phase shift.

In one example, the identification tag 100 includes a volume of dielectric material 140 deposited adjacent the spine of the target E resonator 120 and extending along the trace between the upper and lower ends of the spine. In this example, the volume of dielectric material 140 shifts the phase of the baseline response signal by a first phase shift. In another example, the identification tag 100 includes a volume of dielectric material 140 extending between the upper and lower lines and traversing the set of gaps and the middle line. In this example, the volume of dielectric material 140 shifts the phase of the baseline response signal by a second phase shift different from the first phase shift. Alternatively, in the preceding example, the identification tag 100 can further include the volume of dielectric material 140 deposited adjacent the spine of the target E resonator 120 and extending along the trace. In this example, the volumes of dielectric material 140 shift the phase of the baseline response signal by the summation of the first and second phase shifts.

7. Tag Generation

Generally, the system can: generate a map representing a pattern or configuration of volumes of material 140 that, when applied to a target resonator 120 within an identification tag 100, encodes a tag identifier of the identification tag 100 within a target response signal passively broadcast by the identification tag 100; and store the map in a print file, as shown in FIG. 1. The printer 170 can then: access the print file; and generate the identification tag 100 according to the print file. For example, the system can generate the map of volumes of material 140 that, when applied to a target resonator 120 within an identification tag 100, encode a target tag identifier specified by a user. Alternatively, the system can pseudo-randomly generate the map of volumes of material 140 and retroactively link the resulting signal characteristics to a tag identifier (e.g., independent of the initial material configuration).

8. Tag Generation Based on Target Tag Identifier

Blocks of the method S100 recite: accessing a target tag identifier in Block S110; deriving a set of target signal characteristics that encode the target tag identifier in Block S114; and transforming the set of target signal characteristics into a map of volumes of material 140 arranged proximal a target resonator 120 within an identification tag 100 to modulate a baseline response signal of the target resonator 120 to passively broadcast a target response signal exhibiting the set of target signal characteristics in Block S120.

Figure 2:
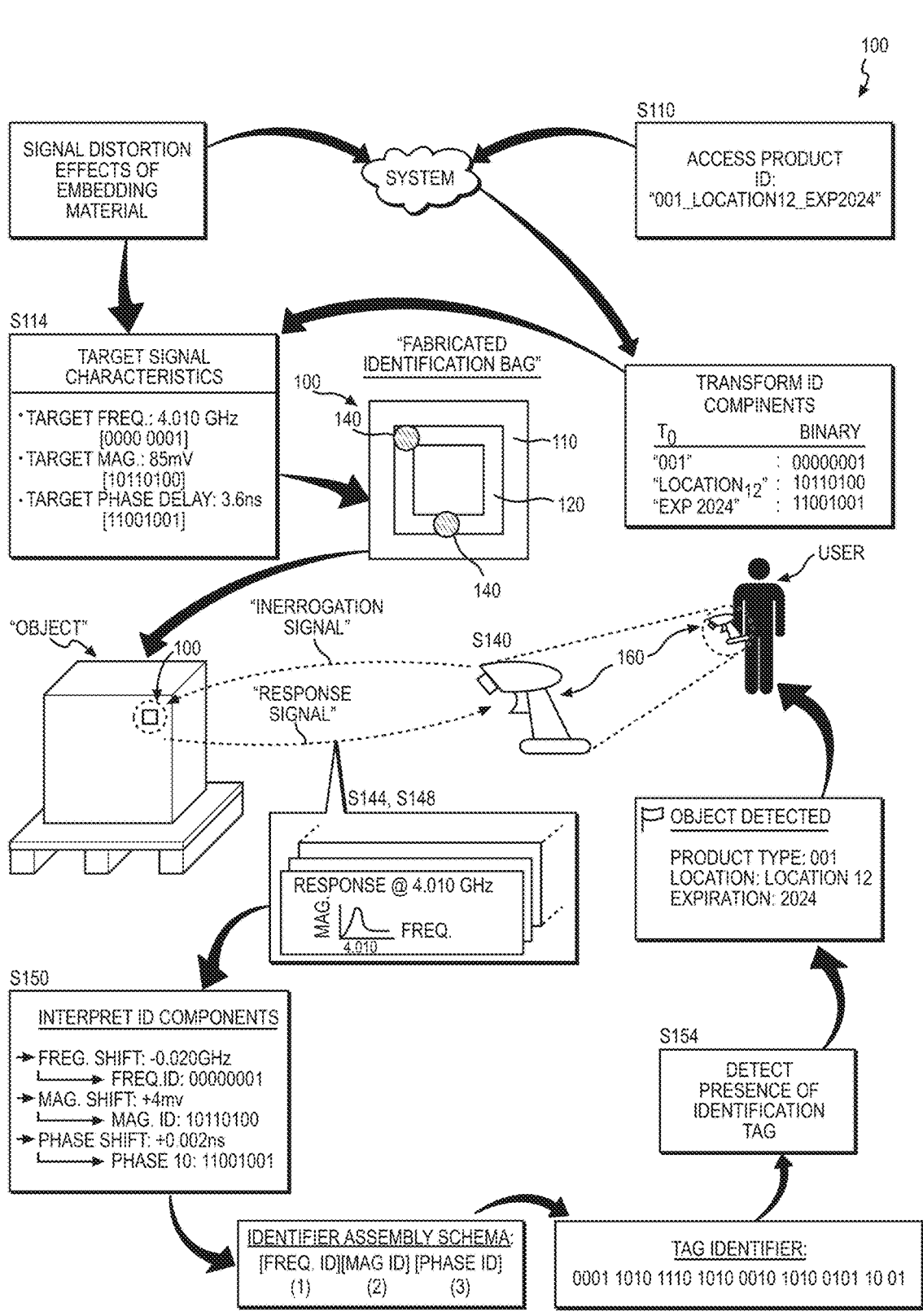
FIG. 2 is a flowchart representation of one variation of the method.

In one implementation, as shown in FIG. 2, the system can: access or receive a target tag identifier (e.g., selected by a user); derive a set of target signal characteristics that encode the target tag identifier; and transform the set of target signal characteristics into a map of volumes of material 140 (e.g., one or more dielectric materials) arranged proximal a target resonator 120 within an identification tag 100. In particular, the system can transform the set of target signal characteristics into a map of volumes of material 140 configured to modulate a baseline response signal of the target resonator 120 to passively broadcast a target response signal exhibiting the set of target signal characteristics.

In one implementation, the system can derive the set of target signal characteristics based on a predefined encoding schema correlating digital tag identifier values to corresponding signal characteristics. For example, the system can: segment the tag identifier into a set of identifier components (e.g., binary values or symbol groups); associate each identifier component with a distinct signal characteristic (e.g., a resonant frequency, amplitude value, or phase delay); and derive a set of target signal characteristics that encodes the tag identifier across one or more dimensions of the target response signal.

In one example, the system: accesses a target tag identifier (e.g., 10011010) corresponding to a unique product identifier (e.g., "ABC-001"); segments the target tag identifier into a set of binary values (e.g., 1001, 1010); derives a first target signal characteristic (e.g., a resonant frequency of 4.001 GHz) encoding a first binary value (e.g., 1001) of the target tag identifier; and derives a second target signal character- istic (e.g., a amplitude at the resonant frequency) encoding a second binary value (e.g., 1001) of the target tag identifier.

In this example, the system encodes discrete portions of the tag identifier into measurable features of the target response signal, such as frequency and amplitude. For example, the first binary value corresponds to a frequency offset from a baseline resonant frequency, while the second binary value defines a threshold amplitude level at this frequency offset. Therefore, the system can define a multi- dimensional encoding structure in which the tag identifier is embedded within multiple signal characteristics of the target response signal.

8.1 Target Signal Characteristics for Embedded Identifica- tion Tag

In one variation, the identification tag 100 can be embed- ded within an object, such as a product packaging, a ship- ping pallet, or a subcomponent of an assembly. In particular, the system can derive the set of target signal characteristics such that the identification tag 100, when embedded within the object, passively broadcasts a target response signal that encodes the tag identifier despite signal distortion introduced by the embedding material.

In this variation, the system can: access a material type of an object configured to embed the identification tag 100; access a material profile of the material type, the material profile specifying signal distortion effects (e.g., dielectric attenuation, frequency shift, and amplitude suppression) of the material type; and derive the set of target signal char- acteristics that encode the target tag identifier and compen- sate for signal modification effects of the material type.

In another variation, the system can: access a material profile of a cover layer 150 arranged over the target reso- nator 120 and volumes of the material 140 within the identification tag 100, the material profile specifying signal distortion characteristics of the cover layer 150; and derive the set of target radio frequency signal characteristics that encode the target tag identifier and compensate for signal modification effects of the cover layer 150.

In one example, an identification tag 100 is configured to embed within a manufacturing tote, located in a manufac- turing facility, configured to store and transport subcompo- nents during an assembly process. In this example, the system: accesses a material profile associated with a poly- propylene-based manufacturing tote that specifies a down- ward frequency shift of approximately 0.500 GHz imposed on the target resonator 120 when embedded in the tote material; derives a target resonant frequency of 4.400 GHz (i.e., the target resonant frequency of the embedded identi- fication tag 100); and normalizes the target resonant fre- quency to 4.900 GHz (i.e., a pre-embedding resonant fre- quency) to compensate for the material-induced shift of the manufacturing tote. Thus, for an identification tag 100 configured to embed within a particular object, the system can pre-compensate for signal modification effects of the embedding material, such that the identification tag 100 passively broadcasts a target response signal that accurately encodes the tag identifier when interrogated.

9. Dielectric Volume Map

Generally, the system can transform a set of target radio frequency signal characteristics, such as a target resonant frequency, target amplitude at resonance, or target phase shift, into a map of material volumes arranged within an identification tag 100. The map defines characteristics (e.g., material type, volume geometry, placement) of one or more volumes of material 140 positioned proximal a target reso- nator 120 in order to modulate a baseline response signal into a target response signal encoding a particular tag identifier. More specifically, the system can transform the set of target radio frequency signal characteristics into a map of material volumes: arranged over the printed circuit board of the identification tag proximal the conductive trace; and configured to shift a target resonant frequency, a target amplitude at the resonant frequency, and a target phase characteristic of the target response signal from the baseline resonant frequency, the baseline amplitude, and at the base- line phase characteristic of the baseline response signal.

For example, the system can: implement a tag identifier model trained on simulated or empirical datasets to generate the map based on correlations between dielectric material configurations and signal characteristics; derive functions correlating dielectric material properties to signal responses based on equivalent RLC circuit modeling; and/or param- eterize physical properties of the target resonator 120 (e.g., trace geometry, conductor spacing, material conductivity) to calculate inductance, capacitance, and resistance values, and derive resulting shifts in resonant behavior based on dielec- tric material placement. Thus, the system can accurately predict or iteratively refine a spatial configuration of mate- rial volumes that yield a target response signal exhibiting the set of target signal characteristics.

9.1 Tag Identifier Model

In one variation, the system can implement a tag identifier model to generate the map based on the set of target signal characteristics. In particular, the tag identifier model can generate the map based on correlations between spatial configurations of material volumes and corresponding radio frequency signal characteristics. More specifically, the tag identifier model can infer a physical material layout that yields a target response signal exhibiting the set of target signal characteristics. In this variation, the system can: derive a set of target signal characteristics that encode a target tag identifier of an identification tag 100; and query the tag identifier model for the map of volumes of material 140 based on the set of target radio frequency signal characteristics.

9.1.1 Tag Identifier Model Generation Based on Tag Simu- lation

In one variation, Blocks of the method S100 recite: generating a set of virtual identification tags 100, each virtual identification tag 100 in the set of virtual identifica- tion tags 100 representing a unique distribution of material 140 applied proximal a virtual target resonator 120 within the virtual identification tag 100, in Block S180; simulating a set of virtual response signals, passively broadcast by the set of virtual identification tags 100, responsive to excitation of virtual target resonators 120 within the set of virtual identification tags 100 by a virtual interrogation signal in Block S184; and training a tag identifier model based on the set of virtual signal characteristics and unique distributions of material 140 represented by the set of virtual identifica- tion tags 100 in Block S186.

Figure 3:
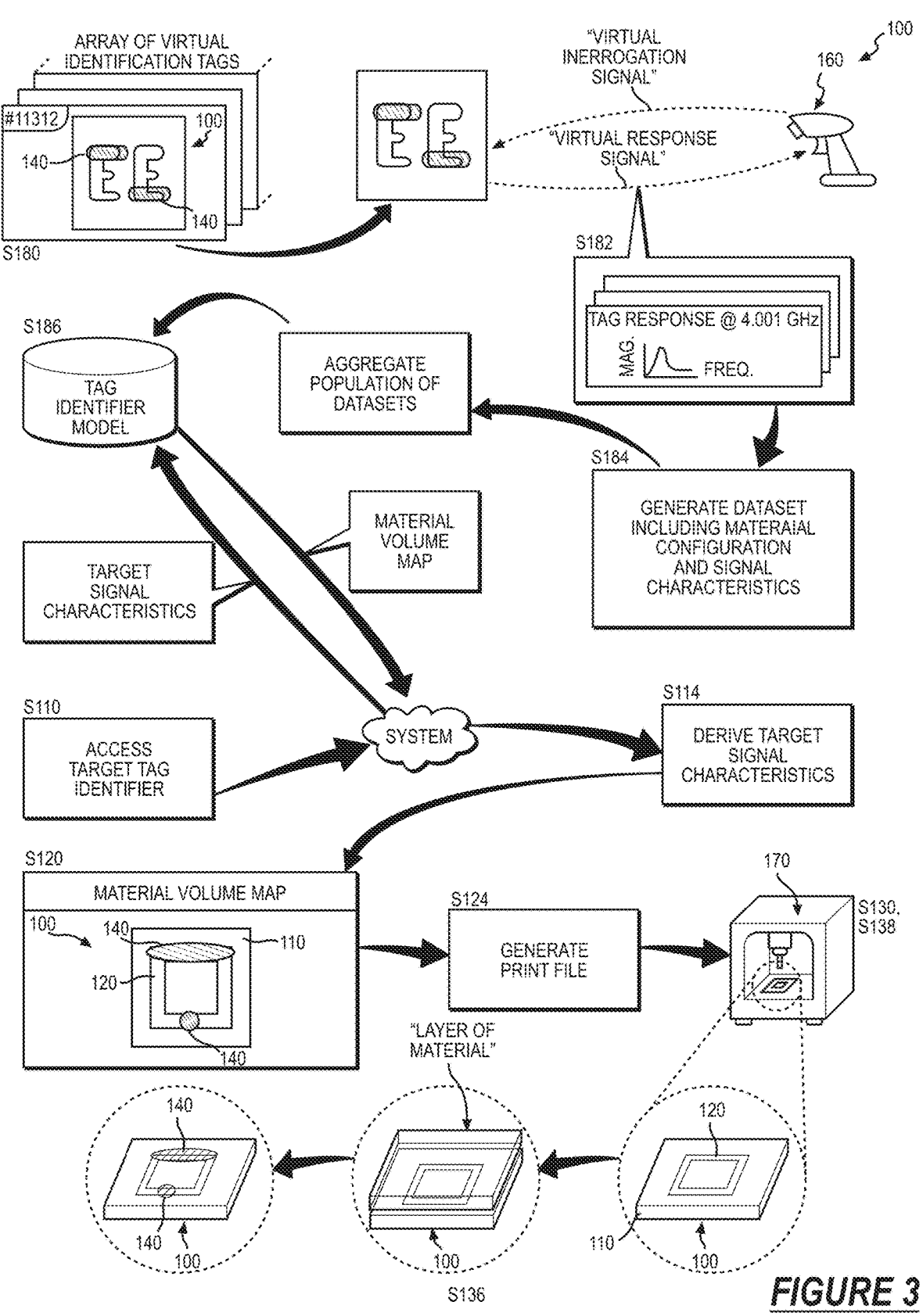
FIG. 3 is a flowchart representation of one variation of the method.

In this variation, the system can virtually simulate an array of virtual identification tags 100 with unique configu- rations to characterize effects of dielectric volume configu- rations on radio frequency signal characteristics, as shown in FIG. 3. For example, the system can generate each virtual identification tag 100 with a unique: quantity of volumes of material 140; placement of volumes of material 140 (e.g., relative to the target resonator 120); materials; and/or dimensions (e.g., diameter, height, or volume). The system can then train the tag identifier model to: ingest target radio frequency signal characteristics; and output maps of volumes of material 140 configured to yield target response signals exhibiting target radio frequency signal characteristics.

In particular, in this variation, the system can generate an array of virtual identification tags 100, each virtual identification tag 100 representing a unique distribution of dielectric material applied proximal a virtual target resonator within the virtual identification tag 100. The system can then, for each virtual identification tag 100 in the array of virtual identification tags 100: simulate a set of virtual response signals, passively broadcast by the set of virtual identification tags 100, responsive to excitation of virtual target resonators 120 within the set of virtual identification tags 100 by a virtual interrogation signal; and detect a set of virtual signal characteristics in the set of virtual response signals.

The system can then train the tag identifier model based on the set of virtual signal characteristics and unique distributions of material 140 represented by the set of virtual identification tags 100. Thus, the system can virtually simulate a population of unique identification tags 100 with diverse dielectric configurations to rapidly model relationships or correlations between physical material placement and passively-broadcast radio frequency signal characteristics.

9.1.2 Tag Identifier Model Generation Based on Empirical Tag Response Measurement In one variation, the system can generate an array of identification tags 100 (i.e., real identification tags) with unique configurations to characterize effects of dielectric volume configurations on radio frequency signal characteristics based on empirical fabrication and measurement of response signals passively broadcast by the identification tags 100. In this variation, the printer 170 can generate an array of identification tags 100, each identification tag 100 including a unique configuration of volumes of material 140. The detector 160 can then, for each identification tag 100: interrogate the identification tag 100 over the frequency band; and record a response signal passively broadcast by the identification tag 100 and exhibiting a set of signal characteristics.

The system can then, for each identification tag 100, generate a dataset including: the unique configuration of volumes of material 140 (e.g., dielectric type, volume, location, geometry); and the set of signal characteristics of the response signal. The system can then: segment the population of datasets into a set of training datasets and a set of testing datasets; and implement model layer techniques to train and validate the tag identifier model based on the set of training datasets and the set of testing datasets. Thus, the system can generate and interrogate physical identification tags 100 to empirically derive correlations between dielectric volume configurations and resulting radio frequency signal characteristics and train the tag identifier model based on real-world fabrication outcomes.

9.2 Equivalent RLC Modeling

In one variation, the system can implement a set of mathematical functions to generate the map of material volumes 140 based on the set of target signal characteristics. In particular, the system can derive a set of functions representing relationships between the set of target radio frequency signal characteristics (e.g., frequency, amplitude)

corresponding to the target tag identifier and the characteristics of the volumes of material 140 (e.g., pattern, position, material). In this variation, the system can represent the target resonator 120 and volumes of material 140 as an equivalent RLC circuit and derive functions correlating the characteristics of the volumes of material 140 to the resultant signal characteristics.

In one example, the system can derive a relationship between frequency shift and the permittivity of a dielectric material. In particular, in this example, the system can: represent the target resonator 120 as an inductor with an inductance of 10 millihenries (or "mH"); represent a volume of dielectric formed from a first material and overlaying the target resonator 120 as a first capacitor with a first capacitance of 100 picofarads (or "pF"); and calculate a first target resonant frequency of 2.005 GHz. The system can then: identify a second dielectric material characterized by a higher permittivity than the first material; represent the volume of dielectric formed from the second material and overlaying the target resonator 120 as a second capacitor with a second capacitance of 200 pF; calculate a second target resonant frequency of 2.003 GHZ; and derive a relationship between frequency shift and the permittivity of a dielectric material based on the difference between the first and second target frequencies.

The system can then implement the set of functions to generate the map of material volumes. For example, the system can: derive a target resonant frequency of the target response signal; access a baseline resonant frequency of the baseline response signal of the target resonator 120; and derive a first position of a first volume of a first dielectric material based on a set of functions modeling relationships between dielectric material configurations and resonant frequency shifts. In particular, the system can derive the first position of the first volume, such that the first volume shifts the baseline resonant frequency to the target resonant frequency.

In this variation, the system can: implement methods and techniques described above to derive a set of target signal characteristics that encode a particular target tag identifier; and implement the set of functions to derive a set of configurations of volumes of material 140 configured to passively broadcast the target response signal exhibiting the target resonant frequency. The system can then repeat this process: to derive a set of configurations of volumes of material 140 configured to passively broadcast the target response signal exhibiting each signal characteristic (i.e., amplitude, phase shift, phase delay, and group delay); and to converge on a configuration of volumes of material 140 configured to passively broadcast the target response signal exhibiting the set of target signal characteristics.

9.3 Physical Parameterization of RLC Circuit

In one variation, the system can represent the physical structure of the target resonator 120 as an equivalent RLC circuit, the inductance (L), capacitance (C), and resistance (R) of the circuit based on the geometry of the target resonator 120 traces, the spacing between adjacent conductors, and the characteristics of volumes of material 140 arranged proximal the target resonator 120. For example, the system can represent the target resonator 120 as: an inductor, formed by the conductive traces of the target resonator 120 and exhibiting an inductance of 10 millihenries (mH); a capacitor, formed by the spacing between the conductive traces and exhibiting a capacitance of 100 picofarads (pF); and a resistive component, corresponding to losses introduced by the trace geometry and material composition, represented as an effective resistance of 0.65 milliohms (m (2). In this example, the identification tag 100 includes volumes of dielectric material 140 positioned to selectively influence the effective inductance, capacitance, and resistance of the target resonator 120. The system can calculate resulting changes in resonant frequency, amplitude, and phase characteristics of the response signal based on modifications to the physical configuration of the target resonator 120 and the spatial distribution of the dielectric volumes.

10. Tag Fabrication

Blocks of the method S100 recite: generating a map of volumes of material 140 arranged proximal a target resonator 120 within an identification tag 100 in Block S120; generating a print file according to the map in Block S124; accessing the print file in Block S130; loading the identification tag 100 in Block S134; and, at a printer 170, applying volumes of material 140 onto the identification tag 100, proximal the target resonator 120, according to the print file in Block S138.

Generally, the system can generate a plan (e.g., a "print file") representing types, locations, volumes, and/or geometries of various materials arranged proximal the target resonator 120 in a tag in order to achieve target shifts in the frequency, amplitude, phase, phase delay, and/or group delay—of a target response returned by this tag when interrogated—that the detector 160 can transform into the target tag identifier of the identification tag 100. The printer 170 (e.g., a dot-matrix printer 170) can execute this plan (or "print file") to automatically fabricate volumes of material 140 of various material types at specific locations, volumes, and/or geometries proximal the target resonator 120.

In one implementation, the printer 170 can: access a print file including a map of volumes of material 140; load an identification tag 100 including a target resonator 120 arranged (i.e., prearranged) over the substrate 110; and fabricate volumes of material 140 over the identification tag 100 according to the print file. Alternatively, the printer 170 can: load a substrate 110; arrange a target resonator 120 over the substrate 110; and fabricate volumes of material 140 over the identification tag 100 according to the print file. In particular, the printer 170 can execute the print file to deposit material volumes at exact, controlled spatial positions, such that the fabricated identification tag 100 passively broadcasts the target response signal exhibiting the target radio frequency signal characteristics that correspond exactly to the encoded tag identifier.

10.1 Tag Fabrication: Selective Material Application

In one variation, the printer 170 can apply (e.g., deposit) exact volumes of material 140 on the identification tag 100, such as by pipetting discrete volumes of material 140 exhibiting specific dimensions and arranged at specific positions (e.g., relative to the target resonator 120) according to the print file (i.e., specified in the map). In one example, a particular map specifies: a first volume of a first dielectric material, exhibiting a first dimension, arranged at a first lateral position and a first longitudinal position relative to the target resonator 120; and a second volume of the first dielectric material, exhibiting a second dimension different from the first dimension, arranged at a second lateral position and a second longitudinal position relative to the target resonator 120. In this example, the printer 170: loads an identification tag 100 including a target resonator 120; deposits (e.g., pipettes) the first dielectric material proximal the first lateral position and the first longitudinal position to form the first volume exhibiting the first dimension; and deposits the first dielectric material proximal the second lateral position and the second longitudinal position to form the second volume exhibiting the second dimension.

10.2 Tag Fabrication: Selective Material Removal

In one variation, Blocks of the method S100 recite, at the printer 170: accessing the print file including a volume of material 140 spanning a surface area proximal a target resonator 120 in Block S130; loading the identification tag 100 including a layer of material coated over a substrate 110 and the target resonator 120 within the identification tag 100 in Block S136; and selectively removing regions of material from the layer of material, outside of the surface area, to form the volume of material 140 in Block S138.

In this variation, the printer 170 can: load an identification tag 100; coat the identification tag 100 with a layer of material; and selectively remove regions of material from the layer of material, such as via laser etching, to form exact volumes of material 140 according to the print file. In this variation, the printer 170 can coat the identification tag 100 with a single, uniform layer of a particular material. Alternatively, the printer 170 can coat particular regions of the identification tag 100 with layers of different materials and/or multiple layers of the same or different materials.

In one example, a particular map specifies: a first volume of a first dielectric material spanning a first surface area proximal to the target resonator 120; and a second volume of the first dielectric material spanning a second surface area proximal the target resonator 120. In this example, the printer 170: loads an identification tag 100 including: a substrate 110; a target resonator 120 arranged on the substrate 110; and a layer of the first dielectric material coated over the substrate 110 and the target resonator 120. The printer 170 then selectively removes (e.g., laser etches) regions of material from the layer of the first dielectric material, outside of the first surface area and the second surface area, to form the first volume of the first dielectric material and the second volume of the first dielectric material proximal the target resonator.

11. Pseudo-Random Tag Generation

In one implementation, rather than generating a map of material volumes based on a predefined tag identifier and associated signal characteristics, the system can pseudo-randomly generate a unique map of material volumes and fabricate an identification tag 100 according to the pseudo-random configuration of material volumes. For example, the printer 170 can: detect a trigger to generate the identification tag 100 based on an input from a user (e.g., via a user interface); and load an identification tag 100 into the printer 170 in response to detecting the trigger. The printer 170 can then: access a print file including a pseudo-randomly generated map of volumes of material 140; and fabricate volumes of material 140, proximal a target resonator 120 within the identification tag 100, according to the print file. For example, the system can generate a print file by: pseudo-randomly defining positions of volumes of dielectric material 140 relative to the target resonator 120 within an identification tag 100; pseudo-randomly defining dimensions (e.g., diameter, height, or volume) of volumes of dielectric material 140; pseudo-randomly defining materials of volumes of dielectric material 140; and compiling positions, dimensions, and materials of volumes of dielectric material 140 into the print file.

Upon fabrication of the identification tag 100, the system can visually inspect the identification tag 100 to detect a real distribution of dielectric material (e.g., size, position, and material type of each volume of material 140) of the identification tag 100; and derive a set of radio frequency signal characteristics of a response signal that the identification tag 100 passively broadcasts (i.e., responsive to interrogation) based on the real distribution of dielectric material. For example, the system can access an image captured by an optical sensor arranged within the printer 170. Alternatively, the system can access an image captured by an optical sensor arranged downstream from the printer 170 (e.g., along an identification tag assembly line).

The system can then: access or receive a tag identifier (e.g., from a user); and store the tag identifier in association with the derived signal characteristics in a tag database containing signal characteristics mapped to tag identifiers. In one example, the system: receives a unique identifier (e.g., a product serial number), associated with an object (e.g., a part or a product unit), from the user; transforms the unique product identifier into the tag identifier (e.g., a binary sequence); and stores the tag identifier, in association with the set of radio frequency signal characteristics, in the tag database. By pseudo-randomly generating identification tags 100 and associating derived signal characteristics with a tag identifier following tag fabrication, the system can rapidly expand a quantity of distinguishable tag configurations without requiring precomputed material layouts.

11.1 Tag Inspection+Real Signal Characteristic Derivation

Blocks of the method S100 recite: accessing an image captured by an optical sensor and depicting the identification tag 100 including volumes of material 140 applied onto the identification tag 100 in Block S160; detecting a real distribution of dielectric material of the identification tag 100, based on the image in Block S162; deriving a set of radio frequency signal characteristics of a response signal of the identification tag 100 based on the real distribution of dielectric material and a tag identifier model correlating dielectric material configurations with signal characteristics in Block S164; accessing a tag identifier for the identification tag 100 in Block S110; and storing the tag identifier in association with the set of radio frequency signal characteristics in an identifier database in Block S166.

Upon fabrication of the identification tag 100, the system can: access an image captured by an optical sensor and depicting the identification tag 100, including volumes of material 140 applied onto the identification tag 100; and detect a real distribution of dielectric material of the identification tag 100 based on the image. In particular, based on the image, the system can detect: the lateral and longitudinal positions of each volume relative to the target resonator 120; the geometry and dimensions of each volume (e.g., diameter, height, cross-sectional area); and/or the material classification of each volume (e.g., via color, reflectivity, or known deposition sequence).

The system can then implement methods and techniques described above to derive a set of radio frequency signal characteristics of a response signal of the identification tag 100 based on: the real distribution of dielectric material; and the tag identifier model correlating dielectric material configurations with signal characteristics. Thus, the system can retroactively assign a tag identifier to a pseudo-randomly generated identification tag 100 by linking the derived signal characteristics to a tag identifier post-fabrication.

11.2 Tag Inspection+Detection of Fabrication Discrepancies

In one variation, Blocks of the method S100 recite: accessing a first print file defining an expected distribution of dielectric material, corresponding to an expected response signal exhibiting a set of expected radio frequency signal characteristics, in Block S130; fabricating a first identification tag according to the first print file and a first set of print parameters in Block S138; detecting a real distribution of dielectric material of the identification tag 100 diverging from the expected distribution of dielectric material in Block S162; in response to the real distribution of dielectric material diverging from the expected distribution of dielectric material, defining a second set of print parameters, different from the first set of print parameters, in Block S170; and fabricating a second identification tag according to a second print file and the second set of print parameters in Block S138.

Figure 4:
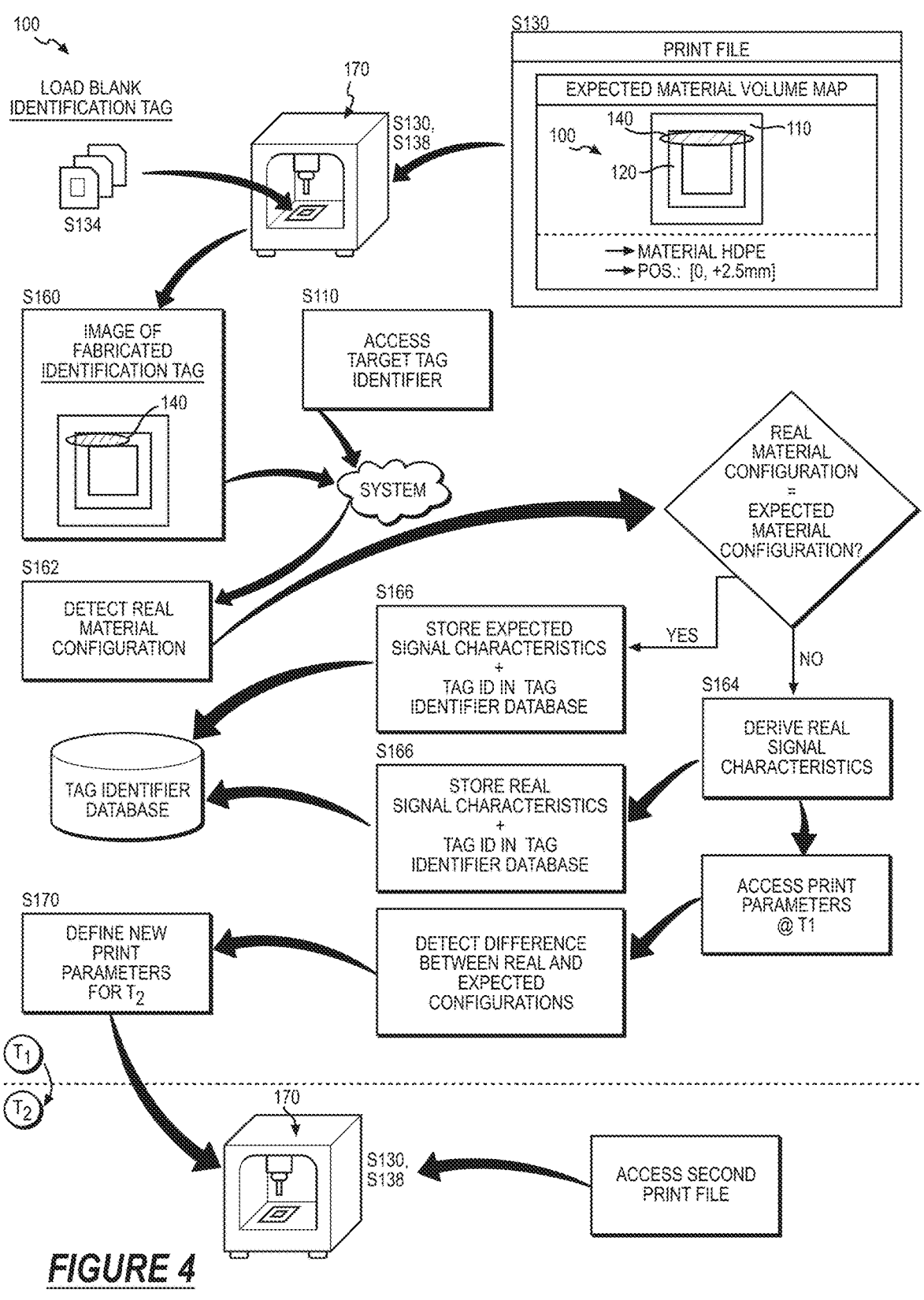
FIG. 4 is a flowchart representation of one variation of the method.

In one variation, as shown in FIG. 4, the system can inspect a fabricated identification tag 100 to detect discrepancies between a real distribution of dielectric material of the identification tag 100 and an expected distribution of dielectric material (i.e., an intended configuration). In particular, the system can inspect each fabricated identification tag 100 for deviations from the expected distribution of dielectric material, such as fabrication error, print process variation, or material drift that may alter the real response signal of the identification tag 100 (i.e., impact accuracy or reliability of tag detection). More specifically, rather than storing a set of expected radio frequency signal characteristics (i.e., corresponding to the expected configuration) without inspecting the identification tag 100, the system can detect the real distribution of dielectric material and derive a corresponding set of real radio frequency signal characteristics for association with the tag identifier.

In this variation, the system can implement methods and techniques described above to detect the real distribution of dielectric material of the identification tag 100 based on the image. The system can then access an expected distribution of dielectric material for the identification tag 100, the expected distribution of dielectric material corresponding to an expected response signal exhibiting a set of expected radio frequency signal characteristics. In response to detecting the real distribution of dielectric material diverging from the expected distribution of dielectric material, the system can: derive the set of radio frequency signal characteristics of the response signal, the set of radio frequency signal characteristics different from the set of expected radio frequency signal characteristics of the expected response signal; discard the set of expected radio frequency signal characteristics; and store the tag identifier in association with the set of radio frequency signal characteristics (i.e., rather than the set of expected radio frequency signal characteristics).

Additionally, in this variation, in response to detecting the real distribution of dielectric material diverging from the expected distribution of dielectric material, the system can selectively adjust print parameters (e.g., print head speed, deposition timing, material volume per cycle) to mitigate the observed discrepancy during fabrication of successive identification tags 100. For example, the printer 170 can implement methods and techniques described above to: fabricate a first identification tag 100 according to a first print file and a first set of print parameters; and detect the real distribution of dielectric material of the first identification tag 100 diverging from an expected distribution of dielectric material of the first identification tag 100. The system can then: detect a difference between the real distribution of dielectric material and the expected distribution of dielectric material; and define a second set of print parameters, different from the first set of print parameters, based on the difference. The system can then fabricate a second identification tag 100 according to a second print file and the second set of print parameters. The system can then repeat this process across successive fabrication cycles to converge on print parameters that reduce or eliminate systematic fabrication deviations, thereby increasing yield and minimizing errors in tag encoding.

12. Tag Identification

Blocks of the method S100 recite: broadcasting an interrogation signal over a frequency band via a detector 160 in Block S140; receiving a target response signal passively broadcast by an identification tag 100 responsive to excitation of a target resonator 120, within the identification tag 100, by the interrogation signal in Block S144; detecting a set of target radio frequency signal characteristics in the target response signal in Block S148; interpreting a set of component identifiers (e.g., binary values) corresponding to the set of target radio frequency signal characteristics in Block S150; and interpreting presence of the identification tag 100 based on correspondence between the identifier components, corresponding to the set of target radio frequency signal characteristics, and the target tag identifier in Block S154.

Generally, the identification tag 100 is interrogated or scanned (e.g., by the detector 160) and identified based on the unique radio frequency response signal (or the "target response signal") passively broadcast by the identification tag 100. In particular, the detector 160 can: interrogate the identification tag 100 over a frequency band of detection frequencies (or "frequency band"); for each frequency, in the frequency band, record a response signal passively broadcast by the identification tag 100; aggregate a response band representing each response signal passively broadcast by the identification tag 100 over the frequency band; identify a target response signal, in the response band, corresponding to a target resonator 120; and interpret a tag identifier of the identification tag 100 based on the signal characteristics of the target response signal.

12.1 Identification Tag Interrogation+Response Band

In one implementation, the detector 160 can interrogate the identification tag 100 over the frequency band and compile each response signal into a response band. In particular, in this implementation the detector 160 can: broadcast an interrogation signal at a particular frequency (e.g., 2.005 GHZ) via the transmitter; and receive and/or record a response signal, exhibiting a set of radio frequency signal characteristics (i.e., a shifted resonant frequency) and passively broadcast by the identification tag 100, via the receiver. The detector 160 can then repeat this process for each frequency in the frequency band to compile or aggregate a response band representing each response signal passively broadcast by the identification tag 100 over the frequency band.

12.1.1 Variation: Scanning for Identification Tag Presence

In one variation, the detector 160 can: execute an initial detection cycle (i.e., broadcast interrogation signals over the frequency band) to detect presence of the identification tag 100 (e.g., an identification tag 100 affixed to an object in a warehouse); and, in response to detecting presence of the identification tag 100 within a detection range (e.g., a threshold distance) of the detector 160, execute a subsequent detection cycle to identify the particular identification tag 100. In particular, in this variation, the detector 160 can: broadcast interrogation signals over a set of course intervals (e.g., 0.5 GHz intervals) over the frequency band to detect presence of the identification tag 100; and, in response to receiving a target response signal (e.g., a minimum amplitude) indicating presence of the identification tag 100 within the detection range of the detector 160, broadcast interrogation signals over a set of refined intervals (e.g., 0.001 GHz intervals) to identify the identification tag 100 (e.g., based on signal characteristics passively broadcast by the identification tag 100). In this variation, the system can reduce detection overhead and minimize power consumption by the detector 160 by limiting high-resolution interrogation to identification tags 100 confirmed to be within detection range.

12.2 Target Response Signal

In one implementation, the detector 160 can identify a target response signal in the response band for identifying the identification tag 100. In particular, in this implementation, the detector 160 can: identify a target response signal between the upper and lower boundaries of the response band corresponding to a target resonator 120; detect a target resonant frequency (e.g., a peak frequency at a maximum amplitude), amplitude, and phase shift corresponding to the target response signal from the response band; and derive a target phase delay and a target group delay based on the target resonant frequency, target amplitude, and target phase shift. The detector 160 can then store a set of target signal characteristics including the target resonant frequency, target amplitude, target phase shift, target phase delay, and target group delay. Thus, the detector 160 can identify and store the target signal characteristics for identifying the identification tag 100, as discussed below.

12.2.1 Variation: Target Response Series

In one variation, rather than identifying a particular target response signal (e.g., at a maximum amplitude), the detector 160 can identify a series of target response signals in the response band. For example, the detector 160 can detect a series of target response signals based on the target amplitude (e.g., above 80% amplitude power range) and/or the peak target resonant frequency (e.g., deviating by 0.001 GHz from the peak target resonant frequency). Thus, in this variation, the system can encode an expanded range of identifier components into distinct signal characteristics and/or composite signal characteristics of the response signal to increase the storage capacity of the identification tag 100.

12.3 Interpretation of Identifier Components

In one implementation, the detector 160 can: detect each target signal characteristic in the target response signal; and interpret an identifier component corresponding to the target signal characteristic. For example, the detector 160 can: detect a peak resonant frequency of the target response signal; assign a binary identifier to the peak resonant frequency based on presence or absence of a frequency shift (i.e., relative to the known baseline resonant frequency) in the target response signal (i.e., a binary value of "0" for unshifted resonant frequencies or a binary value of "1" for shifted resonant frequencies); and append the tag identifier with the binary identifier. The detector 160 can repeat this process for each target signal characteristic (i.e., target amplitude, phase shift, phase delay, and group delay): to detect shifts relative to the baseline signal characteristics; and append the tag identifier with binary identifiers based on presence or absence of a signal characteristic shift.

Additionally or alternatively, the detector 160 can: detect a peak resonant frequency of the target response signal; identify a frequency subrange, in the frequency band, corresponding to the peak resonant frequency; initialize a tag identifier for the identification tag 100; and append the tag identifier with a frequency identifier corresponding to the frequency subrange. The detector 160 can repeat this process for each target signal characteristic (i.e., target amplitude, phase shift, phase delay, and group delay): to identify a subrange including the target signal characteristic; and to append the tag identifier with an identifier component corresponding to the subrange.

12.4 Assembling Tag Identifier

In one implementation, the detector 160 can assemble the tag identifier of an identification tag 100 based on the identifier components derived from the signal characteristics of the response signal of the identification tag 100. In particular, the detector 160 can: for each signal characteristic, in the set of target signal characteristics, interpret an identifier component corresponding to the signal characteristic; aggregate identifier components corresponding to the set of target signal characteristics into the target tag identifier; and, in response to identifiers corresponding to the set of target signal characteristics matching identifiers of the identification tag 100, detect presence of the identification tag 100.

In one example, an identification tag 100 includes: a first volume of dielectric material 140 configured to shift a baseline resonant frequency of the target resonator 120 to a target resonant frequency; and a second volume of dielectric material 140 (e.g., a different material), configured to shift a baseline amplitude, at the baseline resonant frequency of the target resonator 120, to a target amplitude at the target resonant frequency. In this example, the detector 160 implements methods and techniques described above to: interrogate the identification tag 100 over the frequency band; and detect the target resonant frequency and the target amplitude at the target resonant frequency in the target response signal passively broadcast by the identification tag 100. The detector 160 then: interprets a first identifier component (e.g., a binary value) of the target tag identifier based on a first difference between the baseline resonant frequency and the target resonant frequency; interprets a second identifier component of the target tag identifier based on a second difference between the baseline amplitude and the target amplitude at the target resonant frequency; and aggregates the first identifier component and the second identifier component into a target tag identifier.

In another example, the detector 160 implements methods and techniques described above to detect presence of a tag located on a product unit and associated with a target tag identifier including: a first identifier component corresponding to a location of the product unit (e.g., a location within a warehouse); and a second identifier component corresponding to an expiration date of the product unit. In this example, the detector 160 implements methods and techniques described above to broadcast an interrogation signal and receive the target response signal passively broadcast by the identification tag 100. The detector 160 then: detects a first target signal characteristic, encoding the first identifier component, and a second target signal characteristic, encoding the second identifier component, in the target response signal; interprets the first identifier component corresponding to the first target signal characteristic; and interprets the second identifier component corresponding to the second target signal characteristic. In response to correspondence between the first identifier component, the second identifier component, and the target tag identifier, the detector 160 detects presence of the identification tag 100. Additionally, in this example, the detector 160: generates a notification including the target tag identifier and the location of the product unit; and serves the notification to a user (e.g., via a user interface).

In one variation, the detector 160 can assemble the target tag identifier according to a predefined schema (e.g., component order). For example, in the preceding example, the detector 160 accesses a predefined schema specifying positions of component identifiers within tag identifiers based on corresponding signal characteristics, such as in the following order: frequency identifier, amplitude identifier, phase shift identifier, phase delay identifier, and group delay identifier. The detector 160 then aggregates the first component identifier and the second component identifier into the tag identifier with: the first component identifier (i.e., the frequency identifier) in a first position; and the second component identifier (i.e., the amplitude identifier) in a second position following the first position.

12.5 Tag Database

In one variation, as shown in FIG. 4, the system can implement methods and techniques described above to: broadcast interrogation signals over a frequency band to interrogate an identification tag 100; receive a target response signal passively broadcast by the identification tag 100; and detect a set of target radio frequency signal characteristics in the target response signal. In this variation, the system can then: access the identifier database (e.g., a lookup table) correlating target signal characteristics with target tag identifiers; and interpret the target tag identifier of the identification tag 100 based on the set of target signal characteristics and the tag database.

13. Variation: Reference Response

Figure 5:
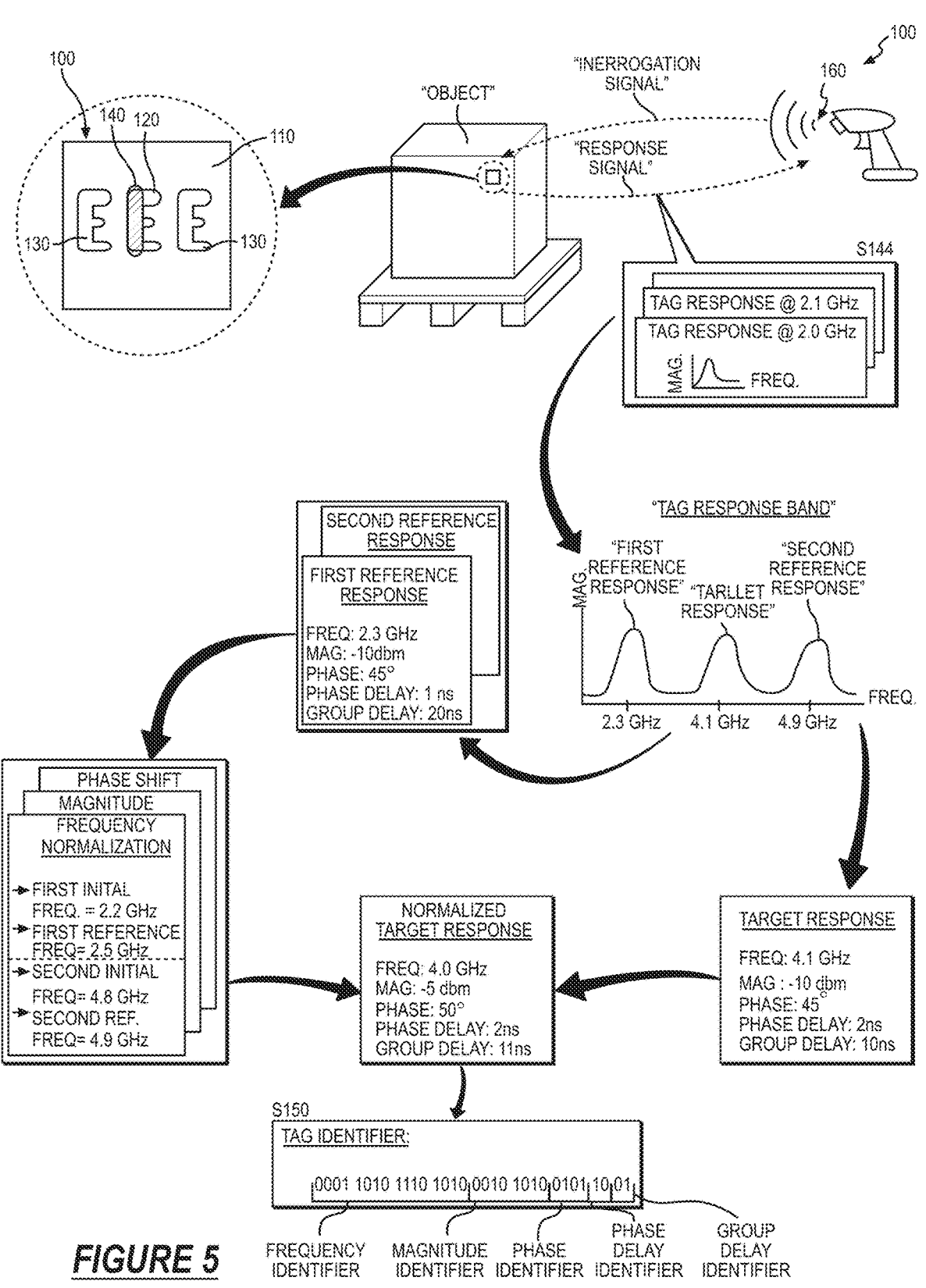
FIG. 5 is a flowchart representation of one variation of the method.

In one variation, as shown in FIG. 5, the identification tag 100 can include a set of (i.e., one or more) reference resonators 130, each reference resonator 130: excluding volumes of material 140; and configured to passively output a baseline response signal at a baseline resonant frequency, at a baseline amplitude at the baseline resonant frequency, and at a baseline phase characteristic responsive to excitation by an interrogation signal and in absence of volumes of dielectric material proximal the target resonator. In this variation, the detector 160 can implement methods and techniques described above to: broadcast an interrogation signal to interrogate the identification tag 100 over the frequency band; receive a target response signal passively broadcast by the identification tag 100 responsive to excitation of the target resonator 120 by the interrogation signal; detect a set of target signal characteristics in the target response signal; receive a reference response signal passively broadcast by the identification tag 100 responsive to excitation of the reference resonator 130 by the interrogation signal; detect a set of real reference signal characteristics in the reference response signal; normalize the target response signal based on the reference response signal; and derive a tag identifier for the identification tag 100 based on the signal characteristics of the normalized target response signal. In particular, the detector 160 can normalize the set of target signal characteristics based on differences between: the set of baseline reference signal characteristics; and the set of real reference signal characteristics. Thus, the detector 160 can detect reference responses passively broadcast by the identification tag 100 to calibrate the target response signal.

In one example, the detector 160 can: identify a first real reference response proximal a lower boundary of the response band and corresponding to a first reference resonator 130 tuned to a first set of baseline reference signal characteristics; detect a first real reference frequency (e.g., a peak frequency at a maximum amplitude), amplitude, and phase shift corresponding to the first reference response signal; and derive a first real reference phase delay and a first real reference group delay based on the first real reference frequency, amplitude, and phase shift. The detector 160 can then store a first set of real reference signal characteristics including the first real reference frequency, first real reference amplitude, first real reference phase shift, first real reference phase delay, and first real reference group delay. The detector 160 can then repeat this process to: identify a second real reference response signal proximal an upper boundary of the response band and corresponding to a second reference resonator 130 tuned to a second set of baseline reference signal characteristics; and store a second set of real reference signal characteristics including a second real reference frequency, a second real reference amplitude, a second real reference phase shift, a second real reference phase delay, and a second real reference group delay.

In one variation, the detector 160 can calibrate (or "normalize") the target resonant frequency and associate the identification tag 100 with a frequency identifier. In particular, in this variation, the detector 160 can: detect a first real reference frequency in the first set of real reference signal characteristics corresponding to the first reference resonator 130; detect a second real reference frequency in the second set of real reference signal characteristics corresponding to the second reference resonator 130; and calibrate (or "normalize") the target resonant frequency based on a first difference between the first baseline frequency and the first real reference frequency and a second difference between the second baseline frequency and the second real reference frequency. For example, the detector 160 can normalize the target resonant frequency based on a function relating the first difference and the second difference. Alternatively, the detector 160 can normalize the target resonant frequency by interpolating between the first difference and the second difference.

The detector 160 can then: identify a frequency subrange, in the frequency band, corresponding to the normalized target resonant frequency; initialize a tag identifier for the identification tag 100; and append the target tag identifier with a frequency identifier corresponding to the frequency subrange. The detector 160 can repeat this process: to normalize each target signal characteristic (i.e., target amplitude, phase shift, phase delay, and group delay) based on the corresponding difference between each of the baseline reference signal characteristics and real reference signal characteristics passively broadcast by the reference resonators 130; to identify subranges representing each of the normalized target signal characteristics; and to append the target tag identifier with each identifier corresponding to the subrange.

In one example, the identification tag 100 includes: a first reference resonator 130 tuned to a first baseline frequency of 2.002 GHz; a second reference resonator 130 tuned to a second baseline frequency of 4.008 GHz; and a target resonator 120. In this example, the detector 160 can: interrogate the identification tag 100 over a frequency band between 2.000 GHz to 5.000 GHz; receive a first real reference response signal, at a first real reference frequency of 2.003 GHZ, passively broadcast by the first reference resonator 130; receive a second real reference response signal, at a second real reference frequency of 4.009 GHZ, passively broadcast by the second reference resonator 130; receive a target response signal, at a target resonant frequency of 4.001 GHZ, passively broadcast by the target resonator 120; and normalize the target response signal to derive a normalized target resonant frequency of 4.000 GHz based on the differences between the first and second baseline and real reference frequencies.

The detector 160 can then: initialize a tag identifier including a 28-bit binary string; identify a frequency sub-range, in the frequency band, corresponding to the normalized target resonant frequency of 4.000 GHz; and append the target tag identifier with a frequency identifier component representing the frequency subrange (e.g., a numerical value of 6826) in 16-bit binary format (e.g., "0001101011101010"). In particular, in this example, the frequency band can be segmented into a set of frequency subranges spanning from the lower boundary to the upper boundary of the frequency band, each frequency subrange corresponding to an encoded numerical value (i.e., the frequency identifier component).

The detector 160 can then repeat this process for each normalized target signal characteristic (i.e., amplitude, phase shift, phase delay, and group delay) to concatenate the set of identifiers into the 28-bit binary string. Alternatively, the target tag identifier can be represented in another format, such as a 28-bit binary string, a 64-bit binary string, and/or a 128-bit binary string. Therefore, the system can identify target signal characteristics (e.g., peak frequency), encode each signal characteristic into an identifier component, and assemble comprehensive sets of identifiers.

14. Disclaimer

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

accessing a target tag identifier;

deriving a set of target radio frequency signal characteristics that encode the target tag identifier;

transforming the set of target radio frequency signal characteristics into a map of volumes of a first dielectric material:

arranged proximal a target resonator within an identification tag to modulate a baseline response signal of the target resonator to passively broadcast a target response signal exhibiting the set of target radio frequency signal characteristics; and generating a print file according to the map.

2. The method of claim 1, further comprising, at a printer:

accessing the print file;

loading the identification tag; and applying volumes of the first dielectric material onto the identification tag, proximal the target resonator, according to the print file.

3. The method of claim 2:

wherein transforming the set of target radio frequency signal characteristics into the map comprises transforming the set of target radio frequency signal characteristics into the map representing:

a first volume of the first dielectric material:

arranged at a first lateral position and a first longitudinal position relative to the target resonator; and exhibiting a first dimension; and a second volume of the first dielectric material:

arranged at a second lateral position and a second longitudinal position relative to the target resonator; and exhibiting a second dimension different from the first dimension; and wherein applying volumes of the first dielectric material onto the identification tag comprises:

depositing the first dielectric material onto the identification tag, proximal the first lateral position and the first longitudinal position, to form the first volume exhibiting the first dimension; and depositing the first dielectric material onto the identification tag, proximal the second lateral position and the second longitudinal position, to form the second volume exhibiting the second dimension.

4. The method of claim 1:

wherein transforming the set of target radio frequency signal characteristics into the map comprises transforming the set of target radio frequency signal characteristics into the map representing:

a first volume of the first dielectric material spanning a first surface area proximal the target resonator; and a second volume of the first dielectric material spanning a second surface area proximal the target resonator; and further comprising, at a printer:

accessing the print file;

loading the identification tag comprising:

a substrate;

the target resonator arranged on the substrate; and a first layer of the first dielectric material coated over the substrate and the target resonator; and selectively removing regions of the first layer of the first dielectric material, outside of the first surface area and the second surface area, to form the first volume of the first dielectric material and the second volume of the first dielectric material proximal the target resonator.

5. The method of claim 1:

further comprising:

generating a set of virtual identification tags, each virtual identification tag in the set of virtual identification tags representing a unique distribution of dielectric material applied proximal a virtual target resonator within the virtual identification tag;

simulating a set of virtual response signals, passively broadcast by the set of virtual identification tags, responsive to excitation of virtual target resonators within the set of virtual identification tags by a virtual interrogation signal;

extracting a set of virtual signal characteristics from the set of virtual response signals; and training a tag identifier model based on the set of virtual signal characteristics and unique distributions of dielectric material represented by the set of virtual identification tags, the tag identifier model configured to:

ingest target radio frequency signal characteristics; and output maps of volumes of dielectric materials configured to yield target response signals exhibiting target radio frequency signal characteristics; and wherein transforming the set of target radio frequency signal characteristics into the map of volumes of the first dielectric material comprises:

querying the tag identifier model for the map based on the set of target radio frequency signal characteristics that encode the target tag identifier.

6. The method of claim 1:

wherein deriving the set of target radio frequency signal characteristics comprises deriving a first target resonant frequency encoding a first identifier component of the target tag identifier; and wherein transforming the set of target radio frequency signal characteristics into the map of volumes of the first dielectric material comprises:

accessing a first baseline resonant frequency of the baseline response signal of the target resonator; and deriving a first position of a first volume of the first dielectric material, configured to shift the first baseline resonant frequency to the first target resonant frequency, based on a set of functions modeling relationships between dielectric material configurations and resonant frequency shifts.

7. The method of claim 1:

wherein accessing the target tag identifier comprises:

accessing a unique product identifier associated with an object;

segmenting the unique product identifier into a set of identifier components; and transforming each identifier component, in the set of identifier components, into a binary value;

wherein deriving the set of target radio frequency signal characteristics comprises deriving the set of target radio frequency signal characteristics comprising:

a first target signal characteristic encoding a first binary value corresponding to a first identifier component of the target tag identifier; and a second target signal characteristic encoding a second binary value corresponding to a second identifier component of the target tag identifier; and wherein transforming the set of target radio frequency signal characteristics into the map comprises transforming the set of target radio frequency signal characteristics into the map representing:

a first volume of the first dielectric material arranged at a first position relative to the target resonator to induce the first target signal characteristic in the target response signal passively broadcast by the identification tag; and a second volume of the first dielectric material arranged at a second position and a second longitudinal position relative to the target resonator to induce the second target signal characteristic in the target response signal passively broadcast by the identification tag.

8. The method of claim 7, further comprising:

at a printer:

accessing the print file;

loading the identification tag; and applying volumes of the first dielectric material onto the identification tag to form the first volume of the first dielectric material proximal the first position and the second volume of the first dielectric material proximal the second position;

broadcasting an interrogation signal over a frequency band via a detector;

receiving the target response signal passively broadcast by the identification tag responsive to excitation of the target resonator by the interrogation signal;

detecting the first target signal characteristic and the second target signal characteristic from the target response signal;

interpreting the first binary value corresponding to the first target signal characteristic;

interpreting the second binary value corresponding to the second target signal characteristic;

combining the first binary value and the second binary value into a binary sequence; and in response to correspondence between the binary sequence and the target tag identifier, detecting presence of the identification tag.

9. The method of claim 8:

wherein deriving the set of target radio frequency signal characteristics comprises deriving the set of target radio frequency signal characteristics comprising:

the first target signal characteristic comprising a first resonant frequency of the target response signal; and the second target signal characteristic comprising a second amplitude value of the target response signal at the first resonant frequency; and wherein combining the first binary value and the second binary value into the target tag identifier comprises:

accessing a predefined schema specifying positions of binary values within target tag identifiers; and combining the first binary value and the second binary value into the target tag identifier according to the predefined schema.

10. The method of claim 1:

wherein deriving the set of target radio frequency signal characteristics comprises deriving the set of target radio frequency signal characteristics of the target response signal passively broadcast by the identification tag responsive to excitation of the target resonator by an interrogation signal, the target resonator:

comprising a conductive trace arranged over a printed circuit board of the identification tag; and configured to passively output the baseline response signal at a baseline resonant frequency, at a baseline amplitude at the baseline resonant frequency, and at a baseline phase characteristic responsive to excitation by an interrogation signal and in absence of volumes of dielectric material proximal the target resonator; and wherein transforming the set of target radio frequency signal characteristics into the map comprises transforming the set of target radio frequency signal characteristics into the map of volumes of the first dielectric material:

arranged over the printed circuit board of the identification tag proximal the conductive trace; and configured to shift a target resonant frequency, a target amplitude at the target resonant frequency, and a target phase characteristic of the target response signal from the baseline resonant frequency, the baseline amplitude, and at the baseline phase characteristic of the baseline response signal.

11. The method of claim 1:

wherein transforming the set of target radio frequency signal characteristics into the map comprises transforming the set of target radio frequency signal characteristics into the map representing:

a first volume of the first dielectric material configured to shift a target resonant frequency, of the target response signal broadcast by the target resonator, from a baseline resonant frequency; and a second volume of a second dielectric material, different from the first dielectric material, configured to shift a target amplitude, of the target response signal, at the target resonant frequency from a baseline amplitude; and further comprising:

broadcasting an interrogation signal via a detector;

detecting the target resonant frequency and the target amplitude, at the target resonant frequency, of the target response signal passively broadcast by the identification tag responsive to excitation of the target resonator by the interrogation signal;

interpreting a first identifier component of the target tag identifier based on a first difference between the baseline resonant frequency and the target resonant frequency;

interpreting a second identifier component of the target tag identifier based on a second difference between the baseline amplitude and the target amplitude at the target resonant frequency; and detecting presence of the identification tag based on correspondence between the first identifier component, the second identifier component, and the target tag identifier.

12. The method of claim 1, further comprising:

broadcasting an interrogation signal over a frequency band via a detector;

receiving the target response signal passively broadcast by the identification tag responsive to excitation of the target resonator by the interrogation signal, the target resonator:

modified by volumes of the first dielectric material; and configured to resonate responsive to the interrogation signal to passively broadcast the target response signal modulated by volumes of the first dielectric material;

detecting the set of target radio frequency signal characteristics in the target response signal;

receiving a reference response signal passively broadcast by the identification tag responsive to excitation of a reference resonator, arranged within the identification tag, by the interrogation signal, the reference resonator:

excluding volumes of the first dielectric material; and configured to passively broadcast a baseline reference response signal exhibiting a set of baseline reference signal characteristics responsive to excitation of the reference resonator by the interrogation signal;

extracting a set of real reference signal characteristics from the reference response signal;

deriving a set of normalized target signal characteristics based on differences between:

the set of baseline reference signal characteristics; and the set of real reference signal characteristics; and interpreting the target tag identifier of the identification tag based on the set of normalized target signal characteristics.

13. The method of claim 1, wherein deriving the set of target radio frequency signal characteristics that encode the target tag identifier comprises:

accessing a material profile of a cover layer arranged over the target resonator and volumes of the first dielectric material within the identification tag, the material profile specifying signal distortion characteristics of the cover layer; and deriving the set of target radio frequency signal characteristics that encode the target tag identifier and compensate for signal modification effects of the cover layer.

14. The method of claim 1, further comprising:

loading a second identification tag into a printer;

accessing a second print file comprising a second map of volumes of dielectric material arranged within the second identification tag;

fabricating volumes of dielectric material, proximal a second target resonator within the second identification tag, according to the second print file;

broadcasting an interrogation signal over a frequency band via a detector;

receiving a second target response signal passively broadcast by the second identification tag responsive to excitation of the second target resonator by the interrogation signal;

deriving a second set of radio frequency signal characteristics of the second target response signal of the second identification tag;

accessing a second tag identifier for the second identification tag; and storing the second tag identifier, in association with the second set of radio frequency signal characteristics, in a tag database.

15. A method comprising:

loading a first identification tag into a printer;

accessing a first print file comprising a first map of volumes of dielectric material arranged within the first identification tag;

fabricating volumes of dielectric material, proximal a first target resonator within the first identification tag, according to the first print file;

broadcasting a first interrogation signal over a frequency band via a detector;

receiving a first response signal passively broadcast by the first identification tag responsive to excitation of the first target resonator by the first interrogation signal;

deriving a first set of radio frequency signal characteristics of the first response signal of the first identification tag;

accessing a first tag identifier for the first identification tag; and storing the first tag identifier, in association with the first set of radio frequency signal characteristics, in a tag database.

16. The method of claim 15, further comprising:

accessing an image captured by an optical sensor and depicting the first identification tag comprising volumes of dielectric material applied to the first identification tag;

detecting a real distribution of dielectric material applied proximal the first target resonator of the first identification tag based on features depicted in the image;

interpreting correlations between the first set of radio frequency signal characteristics of the first response signal and the real distribution of dielectric material;

training a tag identifier model based on correlations between the first set of radio frequency signal characteristics and the real distribution of dielectric material, the tag identifier model configured to:

ingest target radio frequency signal characteristics; and output maps of volumes of dielectric materials configured to yield target response signals exhibiting target radio frequency signal characteristics;

accessing a second target tag identifier;

deriving a second set of target radio frequency signal characteristics that encode the second target tag identifier; and querying the tag identifier model for a second map of volumes of dielectric material based on the second set of target radio frequency signal characteristics, the second map of volumes of dielectric material:

arranged proximal a second target resonator within a second identification tag to modulate a second baseline response signal of the second target resonator to passively broadcast a second target response signal exhibiting the second set of target radio frequency signal characteristics; and generating a second print file according to the first map.

17. The method of claim 16:

wherein accessing the first print file comprises accessing the first print file comprising the first map of volumes of dielectric material representing an expected distribution of dielectric material:

applied proximal the first target resonator of the first identification tag; and corresponding to a first expected response signal exhibiting a first set of expected radio frequency signal characteristics;

wherein detecting the real distribution of dielectric material applied proximal the first target resonator comprises:

detecting the real distribution of dielectric material diverging from the expected distribution of dielectric material defined in the first map of volumes of dielectric material;

wherein deriving the first set of radio frequency signal characteristics comprises:

in response to the real distribution of dielectric material diverging from the expected distribution of dielectric material:

deriving the first set of radio frequency signal characteristics of the first response signal, the first set of radio frequency signal characteristics different from the first set of expected radio frequency signal characteristics of the first expected response signal; and wherein storing the first tag identifier in association with the first set of radio frequency signal characteristics comprises:

in response to the real distribution of dielectric material diverging from the expected distribution of dielectric material:

discarding the first set of expected radio frequency signal characteristics; and storing the first tag identifier in association with the first set of radio frequency signal characteristics.

18. The method of claim 17:

wherein accessing the first print file comprises:

pseudo-randomly defining positions of volumes of dielectric material relative to the first target resonator;

pseudo-randomly defining dimensions of volumes of dielectric material;

pseudo-randomly defining materials of volumes of dielectric material; and compiling positions, dimensions, and materials of volumes of dielectric material into the first print file; and wherein accessing the first tag identifier for the first identification tag comprises receiving the first tag identifier comprising a unique product identifier associated with an object.

19. A system comprising:

an identification tag:

configured to integrate with an object; and comprising:

a substrate;

a target resonator:

arranged on the substrate;

characterized by a baseline resonant frequency; and configured to broadcast a target response signal responsive to excitation by an interrogation signal; and a set of volumes of a dielectric material:

arranged on the substrate proximal the target resonator; and configured to shift a resonant frequency of the target response signal, broadcast by the target resonator responsive to excitation by the interrogation signal, from the baseline resonant frequency by a target frequency difference that encodes an identification value of the identification tag.

20. The system of claim 19, further comprising:

a detector comprising:

a transmitter configured to broadcast interrogation signals over a frequency band;

a receiver configured to receive the target response signal passively broadcast by the identification tag; and a controller configured to:

detect a set of target radio frequency signal characteristics in the target response signal;

for each signal characteristic, in the set of target radio frequency signal characteristics, interpret an identifier component corresponding to the signal characteristic; and detect presence of the identification tag based on correspondence between the identifier components, corresponding to the set of target radio frequency signal characteristics, and the identification value of the identification tag.

* * * * *